US008858322B2

(12) United States Patent
Hayden et al.

(10) Patent No.: US 8,858,322 B2
(45) Date of Patent: Oct. 14, 2014

(54) SYSTEMS AND METHODS FOR REFERRAL BENEFITS

(71) Applicant: Gamesys Ltd., London (GB)

(72) Inventors: Noel Thomas John Hayden, Kingston (GB); Robeson Mandela Reeves, London (GB); Rajko Monden, London (GB); Jeffrey Paul Bannister, Bovingdon (GB); Tobias Patrick O'Rourke, Haslemere (GB); Moustapha Mouhamadou Camara, Romford (GB); Maninder Singh Obhrai, London (GB)

(73) Assignee: Gamesys Ltd., London (GB)

( * ) Notice: Subject to any disclaimer, the term of this patent is extended or adjusted under 35 U.S.C. 154(b) by 0 days.

(21) Appl. No.: 13/802,673

(22) Filed: Mar. 13, 2013

(65) Prior Publication Data

US 2013/0296060 A1 Nov. 7, 2013

Related U.S. Application Data

(60) Provisional application No. 61/642,269, filed on May 3, 2012.

(51) Int. Cl.

| | |
|---|---|
| ***G07F 17/32*** | (2006.01) |
| ***A63F 9/24*** | (2006.01) |
| ***A63F 13/30*** | (2014.01) |

(52) U.S. Cl.

CPC ............ *A63F 13/12* (2013.01); *G07F 17/3225* (2013.01)

USPC .................... 463/25; 463/40; 463/41; 463/42

(58) Field of Classification Search

USPC ................................................ 463/25, 40–42

See application file for complete search history.

(56) References Cited

U.S. PATENT DOCUMENTS

| | | | |
|---|---|---|---|
| 5,537,314 | A | 7/1996 | Kanter |
| 6,029,141 | A | 2/2000 | Bezos et al. |
| 6,289,318 | B1 | 9/2001 | Barber |
| 6,319,122 | B1 | 11/2001 | Packes et al. |
| 6,363,356 | B1 | 3/2002 | Horstmann |
| 6,446,044 | B1 | 9/2002 | Luth et al. |
| 6,503,146 | B2 | 1/2003 | Walker et al. |
| 7,120,797 | B2 | 10/2006 | Wheeler |

(Continued)

FOREIGN PATENT DOCUMENTS

WO WO9916519 4/1999

OTHER PUBLICATIONS

Poisso, Lisa. WOW Rookie: Recruit-a-Friend. [online]. Nov. 26, 2009 [retrieved Apr. 19, 2014]. Retrieved from the Internet: <URL: http://wow.joystiq.com/2009/11/26/wow-rookie-recruit-a-friend/ >.*

(Continued)

*Primary Examiner* — Dmitry Suhol
*Assistant Examiner* — David Duffy
(74) *Attorney, Agent, or Firm* — Fincham Downs, LLC; Carson C. K. Fincham

(57) ABSTRACT

Systems, methods, and articles of manufacture provide for games that may be adjusted to provide bonuses to players playing together, such as when one player has referred the other to the system. Game win amounts may be adjusted to account for bonuses that may be provided to Refer-A-Friend (RAF) players.

20 Claims, 16 Drawing Sheets

(56) References Cited

U.S. PATENT DOCUMENTS

| | | | | |
|---|---|---|---|---|
| 7,240,093 | B1 | 7/2007 | Danieli et al. | |
| 7,249,064 | B1 | 7/2007 | Carmen | |
| 7,311,608 | B1 | 12/2007 | Danieli et al. | |
| 7,319,975 | B2 | 1/2008 | Monteverde | |
| 7,337,133 | B1 | 2/2008 | Bezos et al. | |
| 7,401,150 | B2 | 7/2008 | Shea et al. | |
| 7,412,716 | B2 | 8/2008 | Kikinis et al. | |
| 7,584,118 | B1 | 9/2009 | Bellare et al. | |
| 7,664,726 | B2 | 2/2010 | Jain et al. | |
| 7,689,700 | B2 | 3/2010 | McNeil et al. | |
| 7,774,229 | B1 | 8/2010 | Dernehl et al. | |
| 7,819,749 | B1 | 10/2010 | Fish et al. | |
| 7,912,751 | B1 | 3/2011 | Allos | |
| 7,953,644 | B2 | 5/2011 | Tracey | |
| 7,958,368 | B2 | 6/2011 | Dewey et al. | |
| 8,024,404 | B2 | 9/2011 | Ozzie et al. | |
| 8,041,343 | B2 | 10/2011 | McLean | |
| 8,073,906 | B2 | 12/2011 | Sekaran et al. | |
| 8,078,608 | B2 | 12/2011 | Jones et al. | |
| 8,128,487 | B2 | 3/2012 | Hamilton et al. | |
| 8,161,106 | B2 | 4/2012 | Quinn et al. | |
| 8,180,680 | B2 | 5/2012 | Leventhal | |
| 8,206,224 | B2 | 6/2012 | Farone et al. | |
| 8,306,874 | B2 | 11/2012 | Morgenstern et al. | |
| 8,317,618 | B2 | 11/2012 | Malik | |
| 8,328,643 | B1 | 12/2012 | Osvald et al. | |
| 8,360,858 | B2 | 1/2013 | LaRocca et al. | |
| 8,444,483 | B2 * | 5/2013 | Anderson et al. | 463/25 |
| 8,480,494 | B2 | 7/2013 | Cantor | |
| 8,504,423 | B2 | 8/2013 | Rotbard et al. | |
| 8,506,395 | B2 * | 8/2013 | Bytnar et al. | 463/29 |
| 8,515,807 | B2 | 8/2013 | Tyler et al. | |
| 8,527,319 | B2 | 9/2013 | Shinkawa | |
| 8,533,015 | B2 | 9/2013 | Meegan | |
| 8,538,846 | B2 | 9/2013 | Ransom et al. | |
| 8,554,836 | B1 | 10/2013 | Wilson et al. | |
| 2004/0097287 | A1 | 5/2004 | Postrel | |
| 2005/0014558 | A1 * | 1/2005 | Estey | 463/29 |
| 2006/0247032 | A1 | 11/2006 | Walker et al. | |
| 2006/0264257 | A1 * | 11/2006 | Jaffe et al. | 463/20 |
| 2007/0105627 | A1 * | 5/2007 | Campbell | 463/40 |
| 2007/0225070 | A1 | 9/2007 | Zahorik et al. | |
| 2007/0244757 | A1 * | 10/2007 | Walter | 705/14 |
| 2007/0294088 | A1 * | 12/2007 | Thelen et al. | 705/1 |
| 2007/0294174 | A1 * | 12/2007 | Thelen | 705/52 |
| 2007/0294175 | A1 * | 12/2007 | Thelen | 705/52 |
| 2007/0298857 | A1 | 12/2007 | Schlottmann et al. | |
| 2008/0207297 | A1 | 8/2008 | Zilba | |
| 2008/0234028 | A1 | 9/2008 | Meyer et al. | |
| 2009/0191962 | A1 * | 7/2009 | Hardy et al. | 463/29 |
| 2010/0203935 | A1 | 8/2010 | Levy et al. | |
| 2011/0130197 | A1 * | 6/2011 | Bytnar et al. | 463/25 |
| 2011/0190063 | A1 | 8/2011 | Kajii | |
| 2011/0281642 | A1 | 11/2011 | Hardy et al. | |
| 2012/0302326 | A1 * | 11/2012 | Anderson et al. | 463/25 |
| 2013/0005438 | A1 * | 1/2013 | Ocko et al. | 463/25 |
| 2014/0057705 | A1 * | 2/2014 | Elias et al. | 463/25 |
| 2014/0106866 | A1 * | 4/2014 | Hardy et al. | 463/25 |

OTHER PUBLICATIONS

Jing Wang et al., "Focused on the prize: Characteristics of experts in massive multiplayer online games", First Monday, v. 16, No. 8, ISSN: 1396-0466, Munksgaard International Publishers, Denmark (Aug. 1, 2011); 15 pgs.

* cited by examiner

Copyright © 2012 Gamesys Ltd.

Copyright © 2012 Gamesys Ltd.

Copyright © 2012 Gamesys Ltd.

Copyright © 2012 Gamesys Ltd.

Copyright © 2012 Gamesys Ltd.

SYSTEMS AND METHODS FOR REFERRAL BENEFITS

CROSS-REFERENCE TO RELATED APPLICATIONS

This application claims benefit and priority to, and is a non-provisional of, U.S. Provisional Patent Application No. 61/642,269 filed on May 3, 2012 and titled "SYSTEMS AND METHODS FOR GROUP REFER-A-FRIEND (RAF)", the entirety of which is hereby incorporated by reference herein.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever

BACKGROUND

Referral rewards, as marketing and/or consumer loyalty tools, have consistently been provided in a limited variety of implementations. This is partly due to the fact that the typical implementations of referral programs are relatively easy and/or inexpensive to implement and generally serve their purpose satisfactorily. As consumers continue to expand their online, social media, and/or online gaming activities, however, traditional referral programs fail to provide desirable benefits and/or fail to achieve modern goals.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

Figure 1:
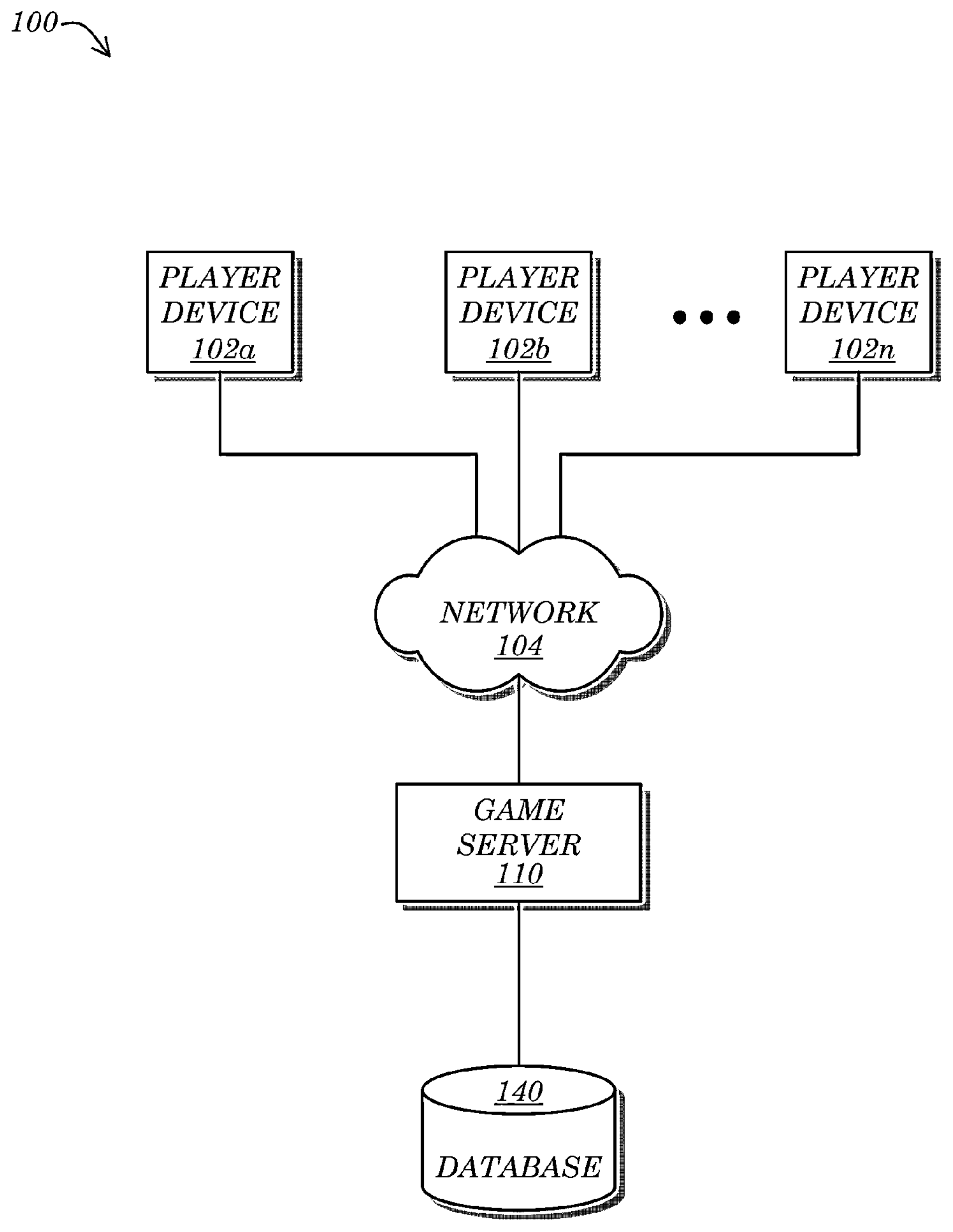
FIG. 1 is a block diagram of a system according to some embodiments.

Embodiments presented herein are descriptive of systems, apparatus, methods, and articles of manufacture for games that may be adjusted to provide bonuses to players playing together, such as when one player has referred the other to the system. Game win amounts may be adjusted to account for bonuses that may be provided to Refer-A-Friend (RAF) players.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

Turning first to FIG. 1, a block diagram of a system 100 according to some embodiments is shown. In some embodiments, the system 100 may comprise a gaming platform such as a gaming platform via which one or more multiplayer and/or online games may be played. In some embodiments, the system 100 may comprise a plurality of player devices 102*a-n* in communication with and/or via a network 104. In some embodiments, a game server 110 may be in communication with the network 104 and/or one or more of the player devices 102*a-n*. In some embodiments, the game server 110 (and/or the player devices 102*a-n*) may be in communication with a database 140. The database 140 may store, for example, game date (e.g., processed and/or defined by the game server 110), data associated with players (not explicitly shown) owning and/or operating the player devices 102*a-n*, and/or instructions that cause various devices (e.g., the game server 110 and/or the player devices 102*a-n*) to operate in accordance with embodiments described herein.

According to some embodiments, any or all of the components 102*a-n*, 104, 110, 140 of the system 100 may be similar in configuration and/or functionality to any similarly named and/or numbered components described herein. Fewer or more components 102*a-n*, 104, 110, 140 (and/or portions thereof) and/or various configurations of the components 102*a-n*, 104, 110, 140 may be included in the system 100 without deviating from the scope of embodiments described herein. While multiple instances of some components 102*a-n* are depicted and while single instances of other components 104, 110, 140 are depicted, for example, any component 102*a-n*, 104, 110, 140 depicted in the system 100 may comprise a single device, a combination of devices and/or components 102*a-n*, 104, 110, 140, and/or a plurality of devices, as is or becomes desirable and/or practicable. Similarly, in some embodiments, one or more of the various components 102*a-n*, 104, 110, 140 may not be needed and/or desired in the system 100.

The player devices 102*a-n*, in some embodiments, may comprise any type or configuration of electronic, mobile electronic, and or other network and/or communication devices (or combinations thereof) that are or become known or practicable. A first player device 102*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102*a-n* may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102*a-n*, the game server 110, and/or the database 140. In some embodiments, the network 104 may comprise direct communications links between any or all of the components 102*a-n*, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102*b* may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 110, 140 of the system 100. The network 104 may comprise one or more cellular telephone networks with communication links between the player devices 102*a-n* and the game server 110, for example, and/or may comprise the Internet, with communication links between the player devices 102*a-n* and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 1; such as the interfaces 920*a-e* of FIG. 9A, FIG. 9B, FIG. 9C, FIG. 9D, and/or FIG. 9E herein) to and/or via the player devices 102*a-n*. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may provide benefits to players based on player referrals and/or based on groups of players that play together in an online multiplayer game.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102*a-n* may comprise the database 140 or a portion thereof, for example, and/or the game server 110 may comprise the database 140 or a portion thereof.

Figure 2:
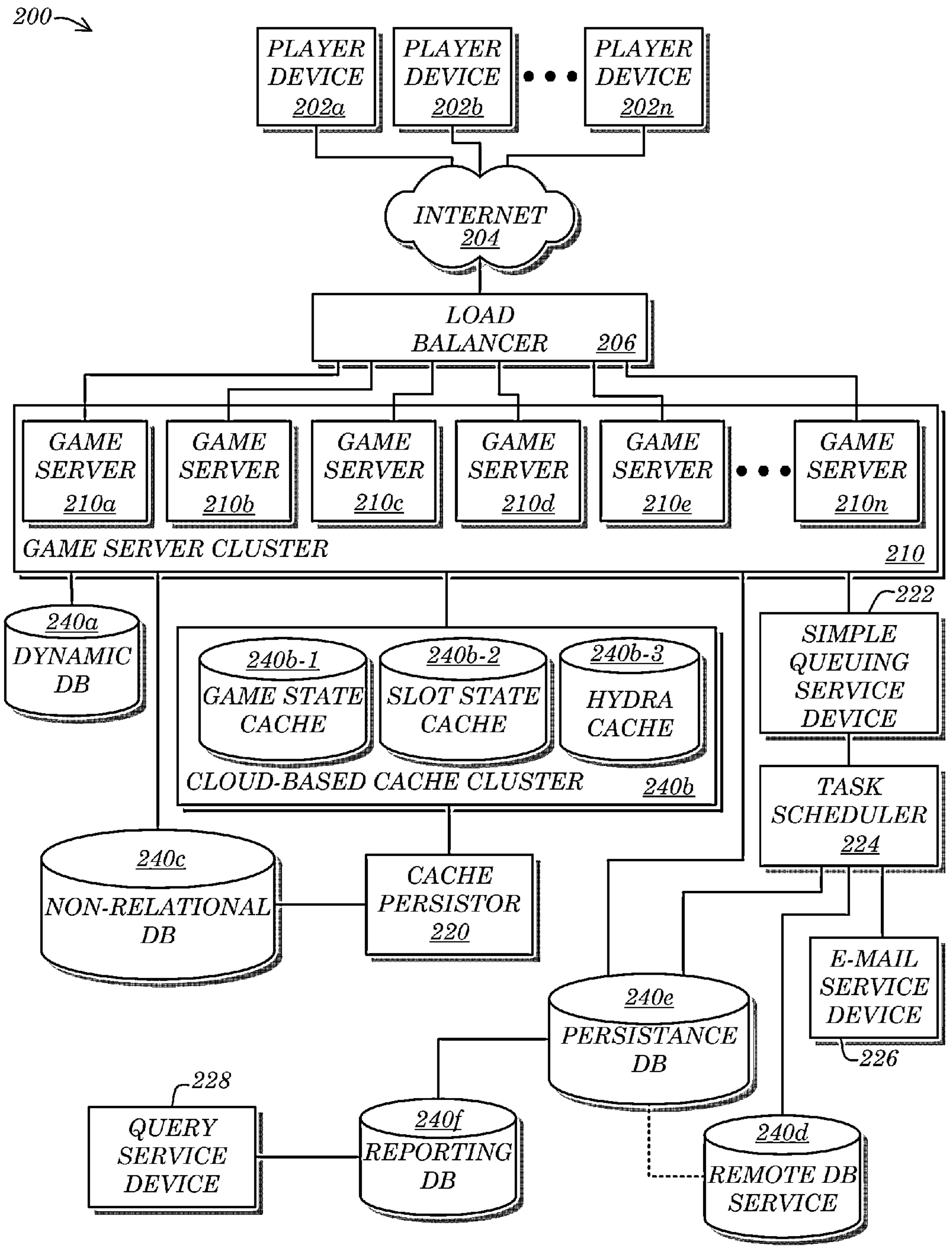
FIG. 2 is a block diagram of a system according to some embodiments.

Referring now to FIG. 2, a block diagram of a system 200 according to some embodiments is shown. In some embodiments, the system 200 may comprise a gaming platform such as a platform via which social, multiplayer, and/or online games may be played. In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., slots) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-game specific state) data may be stored in the slot state cache 240*b*-2, and/or other game and/or player information (e.g., progressive data, referral data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
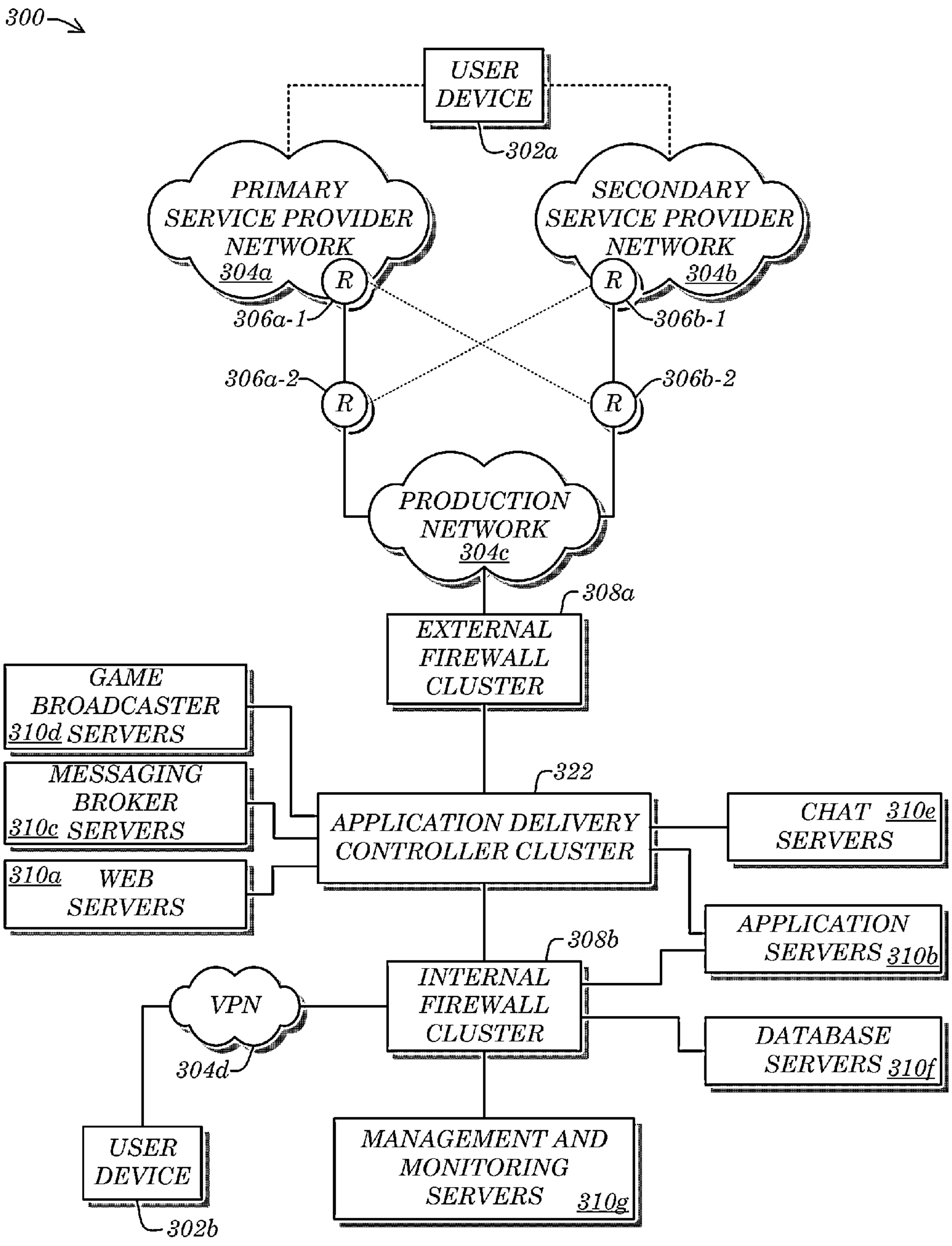
FIG. 3 is a block diagram of a system according to some embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played. In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described herein. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b*, 306*a-b*, 308*a-b*, 310*a-g*, 322 may not be needed and/or desired in the system 300.

In some embodiments, a first user device 304*a* may comprise an electronic device owned and/or operated by a player of an online game (not explicitly shown) and/or by an entity that otherwise accesses online game content and/or services externally (e.g., requiring external login and/or access credentials and/or procedures). The first user device 304*a* may, for example, be utilized to access content provided by and/or via the application delivery controller cluster 322. In some embodiments, the first user device 304*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 304*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and/or commands from the first user device 304*a*. The first user device 304*a* may, for example, submit a call for an online gaming interface (such as the interfaces 920*a*-*e* of FIG. 9A, FIG. 9B, FIG. 9C, FIG. 9D, and/or FIG. 9E herein) to the application delivery controller cluster 322. In some embodiments, the application delivery controller cluster 322 may comprise one or more hardware, software, and/or firmware devices and/or modules configured (e.g., specially-programmed) to route events and/or responses between the first user device 304*a* and one or more of the servers 310*a*-*g*. In the case that the first user device 304*a* is utilized to access an online gaming interface for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines) may be called and/or managed by the application delivery controller cluster 322.

In some embodiments, the messaging broker servers 310*c* may receive and/or retrieve messages from the first user device 304*a* (and/or from one or more of the other servers 310*a*-*b*, 310*d*-*g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 304*a* (e.g., facilitating a decoupling of services provided by various applications on and/or from the various servers 310*a*-*b*, 310*d*-*g*). According to some embodiments, the game broadcaster servers 310*d* may provide scheduled releases of information descriptive of an online game. The game broadcaster servers 310*d* may, for example, provide a broadcast feed of bingo numbers, slot and/or other random (and/or pseudo-random) number results that may be accessed by (and/or transmitted to) the first user device 304*a* (e.g., in connection with the play of an online bingo, slots, and/or other game for which broadcast information may be utilized). In some embodiments, the chat servers 310*e* may provide, manage, and/or facilitate communications between the first user device 304*a* (and/or first user thereof) and one or more other player/user devices (such as a second user device 302*b* and/or other player/user devices not shown in FIG. 3).

According to some embodiments, the second user device 304*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 304*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 304*b* may, for example, be required to provide credentials to and/or otherwise access the application delivery controller cluster 322 and/or servers 310*a*-*g* via the internal firewall cluster 308*b*.

In some embodiments, the database servers 310*f* may provide access to one or more databases and/or data stores (e.g., not shown in FIG. 3; for data storage and/or retrieval). In some embodiments, the management and monitoring servers 310*g* may provide services such as monitoring, reporting, troubleshooting, analysis, configuring, etc. to the second user device 304*b*. The second user device 304*b* may, for example, access the management and monitoring servers 310*g* and/or the database servers 310*f* to run reports descriptive of online gaming operations, game play, and/or game referral setup, management, and/or analysis. According to some embodiments, either or both of the user devices 304*a*-*b* in conjunction with one or more of the servers 310*a*-*g* and/or the application delivery controller cluster 322 may conduct (in whole or in part), facilitate, and/or otherwise be associated with execution of one or more stored procedures, applications, processes, and/or methods (e.g., the method 800 of FIG. 8 herein, and/or a portion thereof).

Utilization of the term "server" with respect to the servers 310*a*-*g* of the system 300 of FIG. 3 is meant solely to ease description of the configuration and/or functionality of the servers 310*a*-*g*. The term "server" is not intended to be limiting with respect to any particular hardware, software, firmware, and/or quantities thereof utilized to implement any or all of the servers 310*a*-*g* of the system 300. Similarly, while multiple types and/or instances of the severs 310*a*-*g* are depicted in FIG. 3, any or all of the servers 310*a*-*g* may be implemented in, on, and/or by one or multiple computer server and/or other electronic devices.

Figure 4:
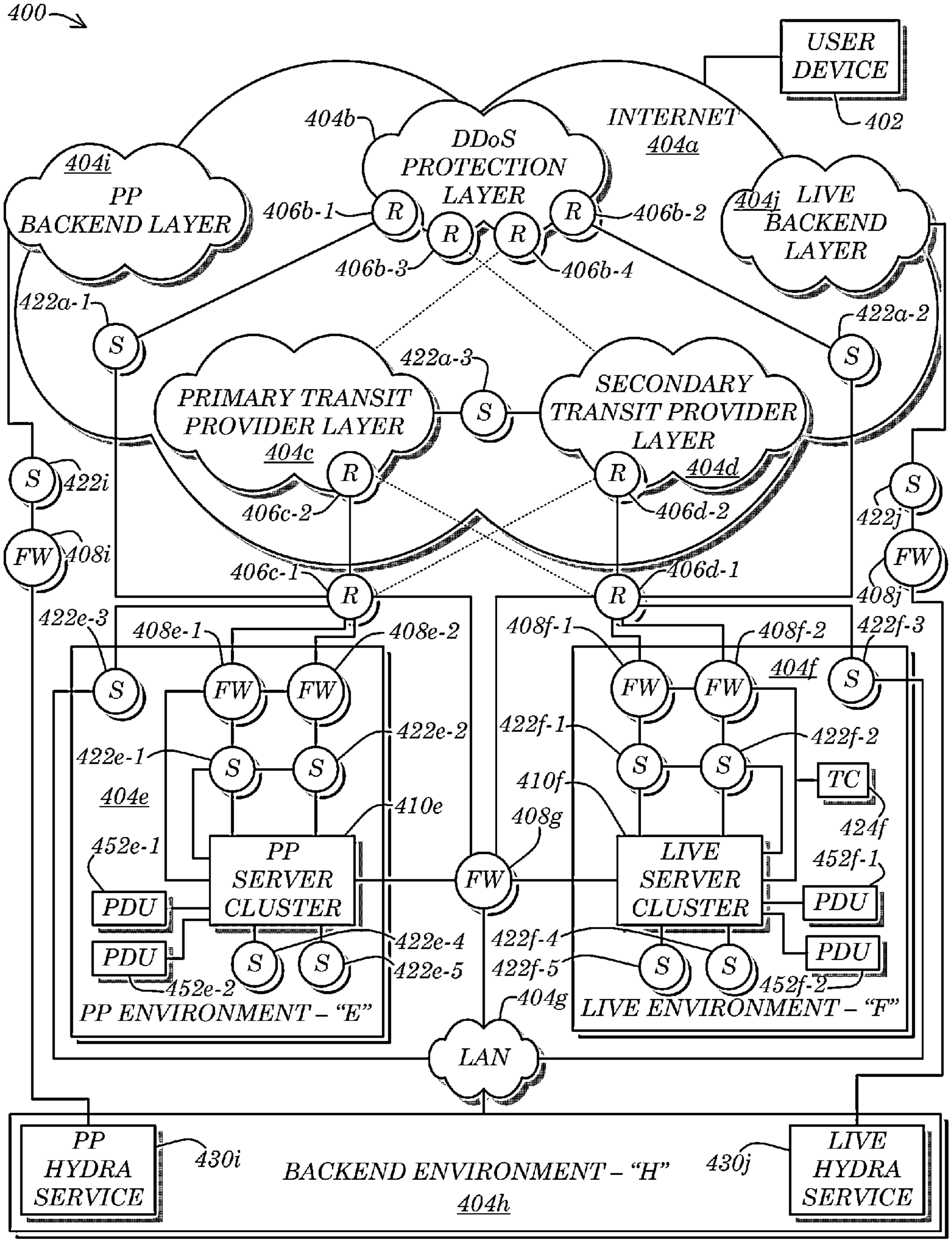
FIG. 4 is a block diagram of a system according to some embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played. The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404*a*-*j* (e.g., the Internet 404*a*, a Distributed Denial-of-Service (DDoS) protection layer 404*b*, a primary transit provider layer 404*c*, a secondary transit provider layer 404*d*, a Pre-Production (PP) environment 404*e*, a live environment 404*f*, a LAN 404*g*, a backend environment 404*h*, a PP backend layer 404*i*, and/or a live backend layer 404*j*), a plurality of routers 406*b-d*, a plurality of firewall devices 408*e-g*, 408*i-j*, a plurality of servers 410*e-f* (e.g., a PP server cluster 410*e* and/or a live server cluster 410*f*), a plurality of switching devices 422*a*, 422*e-f*, 422*i-j*, a Terminal Concentrator (TC) 424*f*, a plurality of "hydra" services 430*i-j* (e.g., a PP hydra service 430*i* and/or a live hydra service 430*j*), and/or a plurality of Power Distribution Unit (PDU) devices 452*e-f*.

According to some embodiments, any or all of the components 402, 404*a-j*, 406*b-d*, 408*e-g*, 408*i-j*, 410*e-f*, 422*a*, 422*e-f*, 422*i-j*, 424*f*, 430*i-j*, 452*e-f* of the system 400 may be similar in configuration and/or functionality to any similarly named and/or numbered components described herein. Fewer or more components 402, 404*a-j*, 406*b-d*, 408*e-g*, 408*i-j*, 410*e-f*, 422*a*, 422*e-f*, 422*i-j*, 424*f*, 430*i-j*, 452*e-f* (and/or portions thereof) and/or various configurations of the components 402, 404*a-j*, 406*b-d*, 408*e-g*, 408*i-j*, 410*e-f*, 422*a*, 422*e-f*, 422*i-j*, 424*f*, 430*i-j*, 452*e-f* may be included in the system 400 without deviating from the scope of embodiments described herein. While multiple instances of some components 404*a-j*, 406*b-d*, 408*e-g*, 408*i-j*, 410*e-f*, 422*a*, 422*e-f*, 422*i-j*, 430*i-j*, 452*e-f* are depicted and while single instances of other components 402, 424*f* are depicted, for example, any component 402, 404*a-j*, 406*b-d*, 408*e-g*, 408*i-j*, 410*e-f*, 422*a*, 422*e-f*, 422*i-j*, 424*f*, 430*i-j*, 452*e-f* depicted in the system 400 may comprise a single device, a combination of devices and/or components 402, 404*a-j*, 406*b-d*, 408*e-g*, 408*i-j*, 410*e-f*, 422*a*, 422*e-f*, 422*i-j*, 424*f*, 430*i-j*, 452*e-f*, and/or a plurality of devices, as is or becomes desirable and/or practicable. Similarly, in some embodiments, one or more of the various components 402, 404*a-j*, 406*b-d*, 408*e-g*, 408*i-j*, 410*e-f*, 422*a*, 422*e-f*, 422*i-j*, 424*f*, 430*i-j*, 452*e-f* may not be needed and/or desired in the system 400.

In some embodiments, the user device 402 may be utilized to access one or more of the PP environment 404*e*, the live environment 404*f*, and/or the backend environment 404*h* via the Internet 404*a*. In some embodiments, the user device 402 may be utilized to access the backend environment 404*h* and/or the PP hydra service 430*i* via the PP backend layer 404*i*. A PP backend switch device 422*i* and/or a PP backend firewall device 408*i* may, for example, gate and/or control access to the backend environment 404*h* and/or the PP hydra service 430*i*, via the PP backend layer 404*i*. In some embodiments, the user device 402 may be utilized to access the backend environment 404*h* and/or the live hydra service 430*j* via the live backend layer 404*j*. A live backend switch device 422*j* and/or a live backend firewall device 408*j* may, for example, gate and/or control access to the backend environment 404*h* and/or the live hydra service 430*j*, via the live backend layer 404*j*.

According to some embodiments, any communications (e.g., requests, calls, and/or messages) from the user device 402 may be passed through the DDoS protection layer 404*b*. The DDoS protection layer 404*b* may, for example, monitor and/or facilitate protection against various forms of cyber attacks including, but not limited to, DDoS attacks. In some embodiments, the DDoS protection layer 404*b* may comprise and/or be in communication with a plurality of DDoS router devices 406*b*-1, 406*b*-2, 406*b*-3, 406*b*-4 that may be utilized to route and/or direct incoming communications (e.g., from the user device 402) to appropriate portions of the system 400.

In some embodiments, the DDoS protection layer 404*b* and/or a first DDoS router device 406*b*-1 may route communications from the user device 402 through and/or via a first switch device 422*a*-1 and/or to, through, and/or via a first primary transit provider router device 406*c*-1. In some embodiments, the first switch device 422*a*-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406*c*-1 may, for example, provide access to the PP environment 404*e* and/or the PP server cluster 410*e* thereof, such as via one or more PP firewall devices 408*e*-1, 408*e*-2 and/or one or more PP switch devices 422*e*-1, 422*e*-2. According to some embodiments, the PP switch devices 422*e*-1, 422*e*-2 may comprise content switching devices that process and route data (e.g., in the data link layer) based on data content. In some embodiments, the first primary transit provider router device 406*c*-1 may direct communications to, through, and/or via a PP LAN switch device 422*e*-3 that provides and/or facilitates access to the LAN 404*g*. The LAN 404*g* may, for example, provide private access to and/or between the PP environment 404*e*, the live environment 404*f*, and/or the backend environment 404*h*. In some embodiments, the first primary transit provider router device 406*c*-1 and/or the PP LAN switch device 422*e*-3 may direct communications to, through, and/or via a LAN firewall device 408*g* that provides direct access to either or both of the PP server cluster 410*e* and the live server cluster 410*f*.

According to some embodiments, the DDoS protection layer 404*b* and/or a second DDoS router device 406*b*-2 may route communications from the user device 402 through and/or via a second switch device 422*a*-2 and/or to, through, and/or via a first secondary transit provider router device 406*d*-1. In some embodiments, the second switch device 422*a*-2 may comprise a device utilized for security switching such as may implement communications in accordance with the GRE communications tunneling protocol described in RFC 2784 "Generic Routing Encapsulation (GRE)" published by the Network Working Group (NWG) in March, 2000. The first secondary transit provider router device 406*d*-1 may, for example, provide access to the live environment 404*f* and/or the live server cluster 410*f* thereof, such as via one or more live firewall devices 408*f*-1, 408*f*-2 and/or one or more live switch devices 422*f*-1, 422*f*-2. According to some embodiments, the live switch devices 422*f*-1, 422*f*-2 may comprise content switching devices that process and route data (e.g., in the data link layer) based on data content. In some embodiments, the first secondary transit provider router device 406*d*-1 may direct communications to, through, and/or via a live LAN switch device 422*f*-3 that provides and/or facilitates access to the LAN 404*g*. In some embodiments, the first secondary transit provider router device 406*d*-1 and/or the live LAN switch device 422*f*-3 may direct communications to, through, and/or via the LAN firewall device 408*g* that provides direct access to either or both of the PP server cluster 410*e* and the live server cluster 410*f*.

In some embodiments, the DDoS protection layer 404*b* and/or one or more of a third DDoS router device 406*b*-3 and/or a fourth DDoS router device 406*b*-4 may route communications from the user device 402 through and/or via one or more of the primary transit provider layer 404*c* and/or the secondary transit provider layer 404*d*. In some embodiments, a transit provider switch device 422*a*-3 may direct, swap, route, and/or manage communications between the primary transit provider layer 404*c* and the secondary transit provider layer 404*d*. According to some embodiments, the transit provider switch device 422*a*-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 3).

Figure 5:
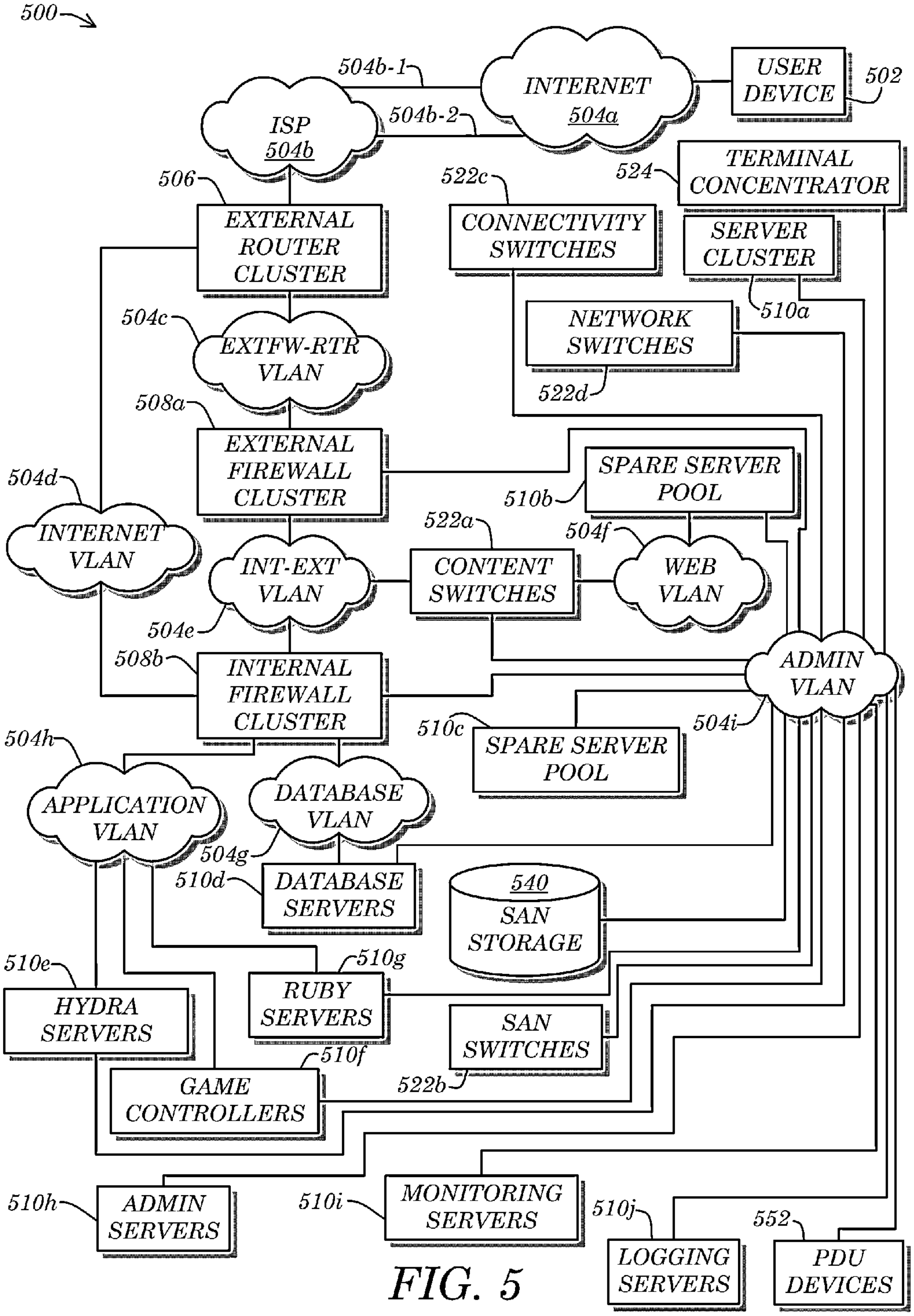
FIG. 5 is a block diagram of a system according to some embodiments.

Turning to FIG. 5, a block diagram of a system 500 according to some embodiments is shown. In some embodiments, the system 500 may comprise and/or define a "back-end" architecture of a gaming platform such as a platform via which social, multiplayer, and/or online games may be played. The system 500 may be utilized in conjunction with the systems 300, 400 if FIG. 3 and/or FIG. 4 herein, for example, and/or may be similar in configuration and/or functionality to the backend environment 404*h* of the system 400 of FIG. 4. In some embodiments, the system 500 may comprise a user device 502, a plurality of networks (and/or environments and/or layers) 504*a-i* (e.g., the Internet 504*a*, an ISP 504*b*, an External Firewall-Router (EXTFW-RTR) Virtual LAN (VLAN) 504*c*, an Internet VLAN 504*d*, an Internal-External (INT-EXT) VLAN 504*e*, a web VLAN 504*f*, a database VLAN 504*g*, an application VLAN 504*h*, and/or an administrator VLAN 504*i*), an external router cluster 506, a plurality of firewall clusters 508*a-b* (e.g., an external firewall cluster 508*a* and/or an internal firewall cluster 508*b*), a plurality of servers 510*a-j* (e.g., a server cluster 510*a*, a first spare server pool 510*b*, a second spare server pool 510*c*, database servers 510*d*, "hydra" servers 510*e*, game controllers 510*f*, ruby servers 510*g*, admin servers 510*h*, monitoring servers 510*i*, and/or logging servers 510*j*), a plurality of switches 522*a-d* (e.g., content switches 522*a*, Storage Area Network (SAN) switches 522*b*, connectivity switches 522*c*, and/or network switches 522*d*), a TC device 524, a SAN storage device 540, and/or one or more PDU devices 552.

According to some embodiments, any or all of the components 502, 504*a-l*, 506, 508*a-b*, 510*a-j*, 522*a-d*, 524, 540, 552 of the system 500 may be similar in configuration and/or functionality to any similarly named and/or numbered components described herein. Fewer or more components 502, 504*a*-1, 506, 508*a-b*, 510*a-j*, 522*a-d*, 524, 540, 552 (and/or portions thereof) and/or various configurations of the components 502, 504*a-l*, 506, 508*a-b*, 510*a-j*, 522*a-d*, 524, 540, 552 may be included in the system 500 without deviating from the scope of embodiments described herein. While multiple instances of some components 504*a-l*, 508*a-b*, 510*a-j*, 522*a-d* are depicted and while single instances of other components 502, 506, 524, 540, 552 are depicted, for example, any component 502, 504*a-l*, 506, 508*a-b*, 510*a-j*, 522*a-d*, 524, 540, 552 depicted in the system 500 may comprise a single device, a combination of devices and/or components 502, 504*a-l*, 506, 508*a-b*, 510*a-j*, 522*a-d*, 524, 540, 552, and/or a plurality of devices, as is or becomes desirable and/or practicable. Similarly, in some embodiments, one or more of the various components 502, 504*a*-1, 506, 508*a-b*, 510*a-j*, 522*a-d*, 524, 540, 552 may not be needed and/or desired in the system 500.

In some embodiments, the user device 502 may be utilized to access and/or interface with one or more of the servers 510*a-j* via the Internet 504*a*. In some embodiments, the Internet 502*a* may be linked to the ISP 504*b* via multiple (e.g., redundant) connectivity paths 504*b*-1, 504*b*-2 (e.g., for load balancing, security, and/or failure recovery). According to some embodiments, the ISP 504*b* may be in communication with (and/or comprise) the external router cluster 506. The external router cluster 506 may route certain requests, calls, and/or transmissions (and/or users—e.g., based on credentials and/or other information) through the EXTFW-RTR VLAN 504*c* and/or through the external firewall cluster 508*a*, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of an entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches 522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f*.

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a-j*, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, settings, and/or performance characteristics or preferences for any or all of the servers 510*a-j*.

In some embodiments, the server cluster 510*a* may comprise one or more servers and/or other electronic controller devices (e.g., blade servers) configured to provide online gaming data (e.g., interfaces and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, results, graphics, sounds, and/or other media to the user device 502 (e.g., via the application VLAN 504*h*). In some embodiments, the ruby servers 510*g* may comprise one or more processing devices configured to provide access to one or more programming languages (e.g., “Ruby”) and/or Application Programming Interface (API) mechanisms via which the servers 510*a-j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

Figure 6:
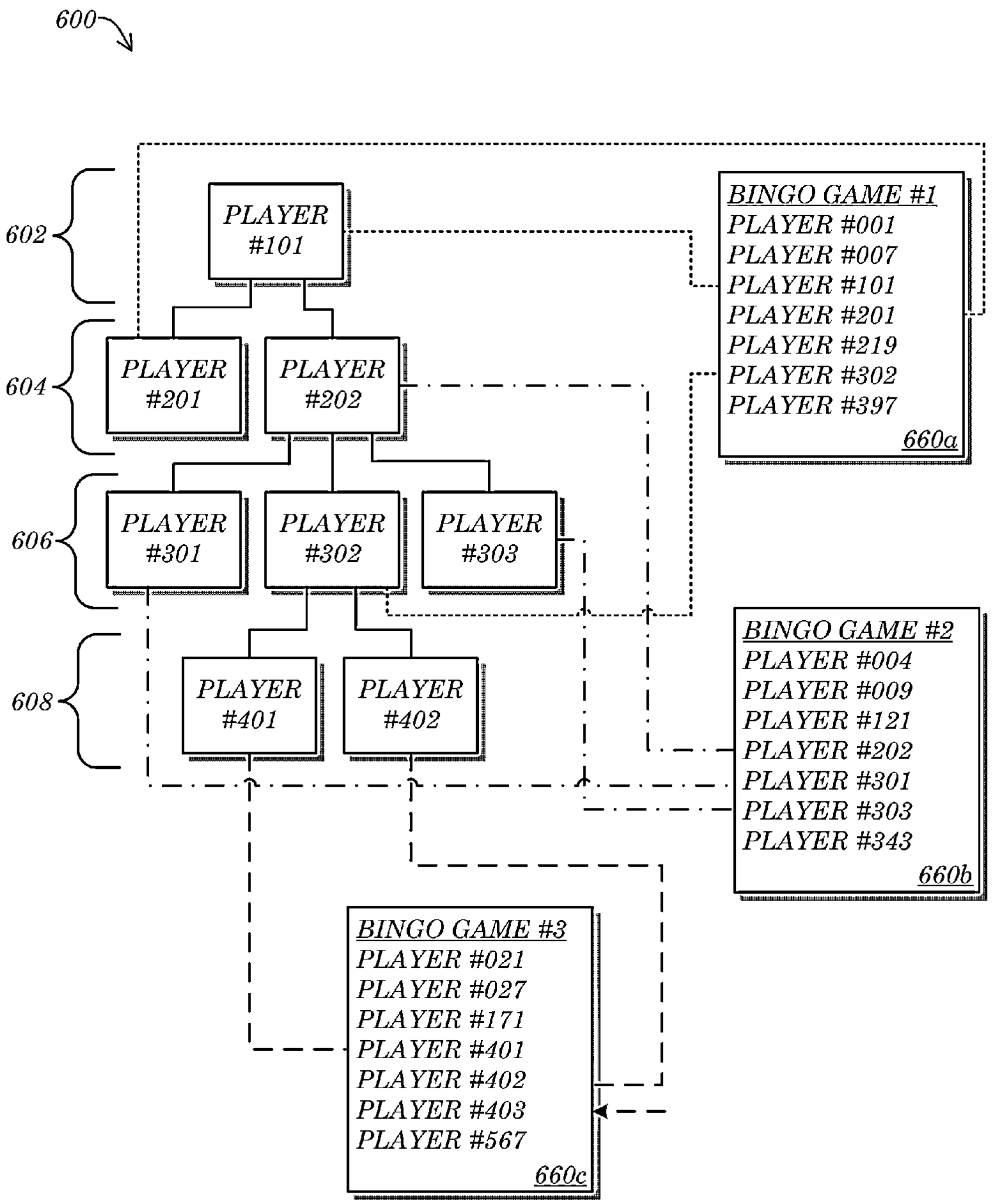
FIG. 6 is a block diagram of a system according to some embodiments.

Referring now to FIG. 6, a block diagram of a system 600 according to some embodiments is shown. In some embodiments, the system 600 may comprise one or more original (and/or referring) players 602 (e.g., player #101; e.g., a “Sugar Daddy” and/or “Parent”), one or more first tier referral players 604 (e.g., players #201 and #202; e.g., “Sugar Buddies” and/or “Children”), one or more second tier referral players 606 (e.g., players #301, #302, and #303; e.g., “Sugar Buddies” and/or “Grandchildren”), and/or one or more third tier referral players 608 (e.g., players #401 and #402; e.g., “Sugar Buddies” and/or “Great-Grandchildren”). In some embodiments, any or all of the players 602, 604, 606, 608 may be associated with one or more game rooms 660*a-c* (e.g., game sessions, game instances, game types, game rooms, etc.).

According to some embodiments, any or all of the components 602, 604, 606, 608, 660*a-c* of the system 600 may be similar in configuration and/or functionality to any similarly named and/or numbered components described herein. Fewer or more components 602, 604, 606, 608, 660*a-c* (and/or portions thereof) and/or various configurations of the components 602, 604, 606, 608, 660*a-c* may be included in the system 600 without deviating from the scope of embodiments described herein. Any component 602, 604, 606, 608, 660*a-c* depicted in the system 600 may comprise a single object, a combination of objects and/or components 602, 604, 606, 608, 660*a-c*, and/or a plurality of objects, as is or becomes desirable and/or practicable. Similarly, in some embodiments, one or more of the various components 602, 604, 606, 608, 660*a-c* may not be needed and/or desired in the system 600.

In some embodiments, the various players 602, 604, 606, 608 may be related via player referrals. The original or Parent player 602, for example, may have invited and/or referred each of the first tier players or Children 604 to an online gaming system (e.g., the system 600). Typical referral systems may provide a bonus and/or other incentive to the Parent player 602 for having referred the Children players 604 (e.g., upon the Children players 604 establishing accounts with the system 600). In some embodiments, the player #202 of the Children players 604 may have similarly referred and/or invited each of the second tier or Grandchildren players 606. In typical systems, the player #202 of the Children players 604 may be rewarded for having referred the Grandchildren players 606. According to some embodiments, the player #302 of the Grandchildren players 606 may have invited and/or referred the Great-Grandchildren players 608. The referral (and/or other, such as a “friend” and/or social networking) relationships between the players 602, 604, 606, 608 depicted in FIG. 6 are provided for non-limiting exemplary purposes and for illustration and ease of description only. Fewer or more referral relationships may be possible and/or desirable in accordance with some embodiments.

According to some embodiments, the players 602, 604, 606, 608 may have access to, login to, register for, enter, join, and/or play an online game (e.g., an online multiplayer game such as bingo) via one or more of the game rooms 660*a-c*. In some embodiments, a first game room 660*a* may host a first game (e.g., “Bingo Game #1”), a second game room 660*b* may host a second game (e.g., “Bingo Game #2”), and/or a third game room 660*c* may host a third game (e.g., “Bingo Game #3”). As depicted in FIG. 6, each game room 660*a-c* may list the players currently logged-in, registered for, joined, and/or playing in the respective game. As utilized herein, the term “game room” may generally refer to any grouping, segmentation, categorization, listing, and/or other virtual and/or actual association between one or more players and a particular game, game type, and/or game session. As is typical in many online games, for example, players may join a particular server hosting a particular game and/or may enter and/or join a particular “room” (e.g., a virtual and/or graphical representation of a particular grouping of players) via which a game may be played. In many cases, such “rooms” comprise “lobbies” or areas where players may virtually congregate between sessions of a game hosted by and/or via the room and/or otherwise when not playing (e.g., prior to joining an actual session of the game play and/or after having joined—e.g., after elimination). According to some embodiments, the game rooms 610*a-c* may comprise online virtual game rooms in which different sessions of the respective games are hosted and/or managed.

In some embodiments, the referral relationships between the various players 602, 604, 606, 608 may be identified and/or determined with respect to one or more of the game rooms 660*a-c*. With respect to the first game room 660*a*, for example, it may be determined that the Parent player 602, player #201 of the Children players 604, and player #302 of the Grandchildren players 606 have each joined, registered for, entered, and/or are otherwise associated with the first game room 660*a*. In some embodiments, it may be determined that each of players #101, #201, and #302 are playing, have played, and/or are likely to imminently play in a game session hosted by and/or via the first game room 660*a*. According to some embodiments, one or more of the players #101, #201, and #302 in the first game room 660*a* may be rewarded based on the referral (and/or other type) of relationship between the players #101, #201, and #302 and based on their joining and/or playing in the first game room 660*a* (e.g., the same game room; and/or game session).

According to some embodiments for example, any or all of the players #101, #201, and #302 may be awarded monetary value (e.g., credits, currency (virtual or real), points, miles) and/or may be awarded a feature, characteristic, power, advantage, bonus, and/or other benefit in the first game room 660*a*, in the respective "Bingo Game #1", and/or in a particular session of the game. In some embodiments, the rewarding may be conducted upon a determination that (i) the players #101, #201, and #302 are all "in" the first game room 610*a*, and/or (ii) the players #101, #201, and #302 are all actively playing (or have completed playing) in/via the first game room 660*a*. For example, the Parent player 602 may receive a bonus of a first magnitude for having managed to have successfully referred both of player #201 and player #302 and for having managed to join the same game room (the first game room 660*a*) and/or game session as the referred player #201 and player #302.

In some embodiments, either or both of player #201 and player #302 may also (or alternatively) receive bonuses, such as of a second magnitude different than the first magnitude (e.g., lower) for having managed to join the same game room (the first game room 660*a*) and/or game session as the Parent player 602. In some embodiments, such referral bonuses may only be provided to one or more of the players #101, #201, and #302 in the case that one or more of such players #101, #201, and #302 achieves a winning condition in a game session conducted via the first game room 660*a*. In the case of the example "Bingo Game #1", for example, in the case that the Parent player 602 wins a bingo match conducted via the first game room 660*a*, the Parent player 602 may be awarded not only the allotted prize for achieving the win, but may also receive a bonus and/or other benefit due to the presence of the player #201 and/or player #302 in the same room and/or session.

As another example, it may be determined that each of player #202 of the Children players 604 and player #301 and player #303 of the Grandchildren players 606 are associated with the second game room 660*b*. It may be determined, for example, that a particular game session is being conducted in and/or via the second game room 660*b* and that the players #202, #301, and #303 are currently competing in the game session (adversarially or cooperatively). In some embodiments, a referral and/or friend reward may be provided in response to such a determination (upon completion of the determination and/or upon one of the players #202, #301, and #303 winning the game session in the second game room 660*b*). In some embodiments, the magnitude of the reward may be based upon the magnitude of related players 602, 604, 606, 608 in the same session/room. In the example of the second game room 660*b*, for example, player #202 may receive a larger benefit (e.g., a double and/or additive bonus) due to two (2) Grandchildren players 606 being in the same session/room as the player #202 (and having been referred, invited, and/or "friended" by, the player #202).

In some embodiments, rewards for playing with (and/or being in the same game room 660*a-c* with) related players (e.g., related by referrals, friend status, and/or otherwise) may be based upon and/or take into account other factors. In the example of the third game room 660*c*, for example, the Great-Grandchildren players 608 may receive a special reward and/or bonus for having managed to join the entire "Great-Grandchild" generation (i.e., all of the Great-Grandchildren players 608) in the same session/room. Such a bonus may differ in magnitude from other related-player bonuses (such as those described with respect to the first game room 660*a* and/or the second game room 660*b*; such as by being larger). In some embodiments, rewards may be based on player participation in the third game room 660*c* (and/or one or more of the game sessions thereof) outside of the relationships of the referral players 602, 604, 606, 608. As indicated by the dotted arrow pointing to player #403, for example, one or more of the players #401, #402, and #403 may receive a reward for playing together, even though player #403 is not a member of the same referral/friend tree. Rewards may be based, for example, on playing with other players having certain predefined characteristics and/or other criteria (known or unknown to the players). The system 600 may reward players having consecutive player identifiers (e.g., players #401, #402, and #403) that play together, for example, and/or may reward players of a certain geographic, demographic, and/or other class, type, and or categorization.

According to some embodiments, a relationship between the original player 602 and one or more of the referral players 604, 606, 608 may be associated (e.g., cause and/or trigger) with an awarding of a benefit, reward, and/or prize based on a magnitude of interaction of the one or more of the referral players 604, 606, 608 with the system 600 (and/or an associated entity). An online gaming, wagering, and/or other entity and/or company may, for example, allow and/or provide login credentials and/or player (or other type) accounts that may be utilized to play games, place wagers, make purchases, win prizes (e.g., jackpots), etc. In some embodiments, a first reward and/or benefit may be provided to the original player 602 in the case that a referral player 604, 606, 608 (i.e., someone that the original player 602 has referred to the entity, company, website, game, and/or system 600) consummates a first action. In some embodiments, one or more second rewards/benefits may be provided in the case that the referral player 604, 606, 608 consummates a second action. A first monetary amount or other award (e.g., a game feature and/or attribute) may be provided to the original player 602 in the case that the referral player 604, 606, 608 visits a website, for example, and/or a second monetary amount/other award may be provided in the case that the referral player 604, 606, 608 creates a player and/or other type of account at/with the website, logs into such an account, places a wager utilizing the account, wins a game utilizing the account, etc. In some embodiments, such tiered benefits may be mutually exclusive—e.g., a second and/or subsequent reward replaces the first reward. According to some embodiments, such benefits may be at least partially cumulative.

Figure 7:
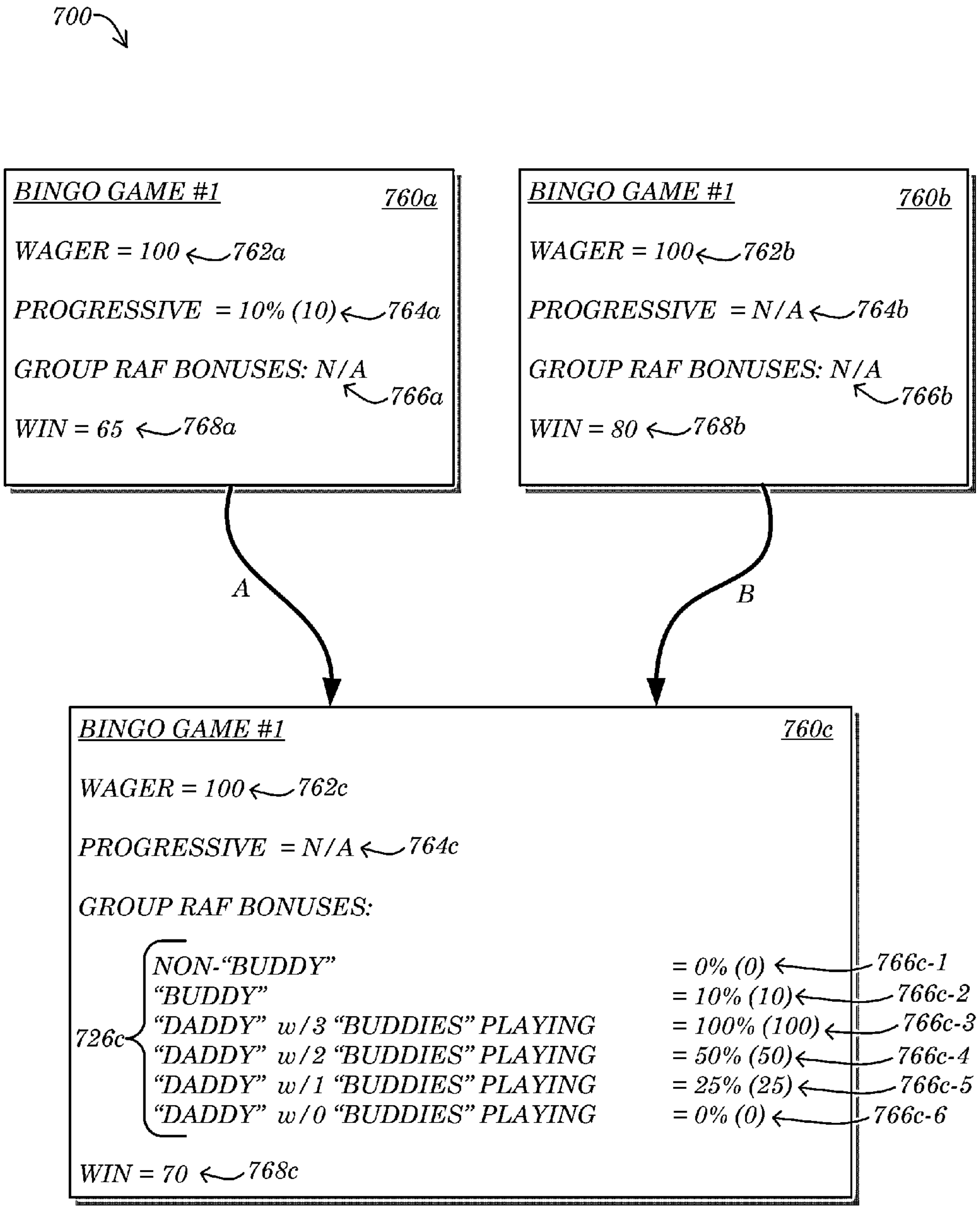
FIG. 7 is a block diagram of a system according to some embodiments.

Turning to FIG. 7, a block diagram of a system 700 according to some embodiments is shown. In some embodiments, the system 700 may comprise a plurality of online games 760*a-c*, each gaming defining and/or comprising various attributes. In the case of an online wagering and/or multiplayer game such as bingo, as depicted, the games 760*a-c* may define and/or comprise wager amounts 762*a-c*, progressive win amounts 764*a-c*, group RAF bonuses 766*a-c*, and/or win amounts 768*a-c*.

According to some embodiments, any or all of the components 760*a-c*, 762*a-c*, 764*a-c*, 766*a-c*, 768*a-c* of the system 700 may be similar in configuration and/or functionality to any similarly named and/or numbered components described herein. Fewer or more components 760*a-c*, 762*a-c*, 764*a-c*, 766*a-c*, 768*a-c* (and/or portions thereof) and/or various configurations of the components 760*a-c*, 762*a-c*, 764*a-c*, 766*a-c*, 768*a-c* may be included in the system 700 without deviating from the scope of embodiments described herein. Any component 760*a-c*, 762*a-c*, 764*a-c*, 766*a-c*, 768*a-c* depicted in the system 700 may comprise a single object, a combination of objects and/or components 760*a-c*, 762*a-c*, 764*a-c*, 766*a-c*, 768*a-c*, and/or a plurality of objects, as is or becomes desirable and/or practicable. Similarly, in some embodiments, one or more of the various components 760*a-c*, 762*a-c*, 764*a-c*, 766*a-c*, 768*a-c* may not be needed and/or desired in the system 700.

In some embodiments, the system 700 may illustrate how player and/or group referrals (and/or other relationships) affect implementation of online games 760*a-c*. A first online game 760*a* (e.g., "Bingo Game #1" as depicted; and/or game session or room) may, for example, be configured to require (and/or accept) a first wager amount 762*a* of one hundred (100) units (e.g., credits, dollars, points, and/or other indicators of monetary, pseudo-monetary, and/or non-monetary value), may provide a first progressive win amount 764*a* of ten percent (10%) of the first wager amount 762*a* (i.e., ten (10) units), and/or may provide a first win amount 768*a* of sixty-five (65) units. In the example of FIG. 7, the first game 760*a* may illustrate an example of a typical "progressive" online game configuration. The first game 760*a* may, as depicted for example, not include and/or offer any first group RAF bonuses 766*a*.

In some embodiments, a second online game 760*b* (and/or game session or room) may also (or alternatively) illustrate an example of a typical "standard" and/or "non-progressive" online game configuration. The second game 760*b* may, for example, be configured to require (and/or accept) a second wager 762*b* of one hundred (100) units (e.g., credits, dollars, points, and/or other indicators of monetary, pseudo-monetary, and/or non-monetary value), may not provide any second progressive win amount 764*b* (and/or may provide the second progressive win amount 764*b* as zero percent (0%) of the second wager amount 762*b* (i.e., zero (0) units)), and/or may provide a second win amount 768*b* of eighty (80) units. In the example of FIG. 7, the second game 760*b* may not include and/or offer any second group RAF bonuses 766*b*.

According to some embodiments, a third game 760*c* (and/or game session or room) may be configured to require (and/or accept) a third wager amount 762*c* of one hundred (100) units (e.g., credits, dollars, points, and/or other indicators of monetary, pseudo-monetary, and/or non-monetary value), may not provide any third progressive win amount 764*c* (and/or may provide the third progressive win amount 764*c* as zero percent (0%) of the third wager amount 762*c* (i.e., zero (0) units)), and/or may provide a third win amount 768*c* of seventy (70) units. In the example of the third game 760*c*, third group RAF bonuses 766*c* are provided. As depicted, for example, a typical player of the third game 760*c* (e.g., a non-"buddy") may be awarded a first bonus amount 766*c*-1 of a first magnitude (e.g., zero percent (0%) or zero (0) units), a player having joined as a result of a referral (and/or otherwise having a pre-defined relationship and/or a relationship of a relatively lower hierarchical rank with respect to another related player; a "buddy") may be awarded a second bonus amount 766*c*-2 of a second magnitude (e.g., ten percent (10%) or ten (10) units), and/or a player having referred others (and/or otherwise having a pre-defined relationship and/or a relationship of a relatively higher hierarchical rank with respect to another related player; a "daddy") may be awarded various bonus amounts based on a number of "buddies" playing in the same session/room/game (e.g., the third game 760*c*) as the "daddy". The "daddy" may be awarded, for example, (i) a third bonus amount 766*c*-3 of a third magnitude (e.g., one hundred percent (100%) or one hundred (100) units) in the case that three (3) "buddies" play with the "daddy", (ii) a fourth bonus amount 766*c*-4 of a fourth magnitude (e.g., fifty percent (50%) or fifty (50) units) in the case that two (2) "buddies" play with the "daddy", (iii) a fifth bonus amount 766*c*-5 of a fifth magnitude (e.g., twenty-five percent (25%) or twenty-five (25) units) in the case that one (1) "buddy" plays with the "daddy", and/or (iv) a sixth bonus amount 766*c*-6 of a sixth magnitude (e.g., zero percent (0%) or zero (0) units) in the case that zero (0) "buddies" play with the "daddy".

The various magnitudes depicted for the bonus amounts 766*c*-1, 766*c*-2, 766*c*-3, 766*c*-4, 766*c*-5, 766*c*-6 are provided as non-limiting examples. Other magnitudes, hierarchical relationships, schemes, and/or configurations of the bonus amounts 766*c*-1, 766*c*-2, 766*c*-3, 766*c*-4, 766*c*-5, 766*c*-6 may be provided in some embodiments. In some embodiments, fewer or more bonus amounts 766*c*-1, 766*c*-2, 766*c*-3, 766*c*-4, 766*c*-5, 766*c*-6 may be provided. In some embodiments, the bonus amounts 766*c*-1, 766*c*-2, 766*c*-3, 766*c*-4, 766*c*-5, 766*c*-6 may be awarded upon the occurrence of various triggering conditions and/or the satisfaction of one or more pre-stored rules and/or criteria. The second bonus amount 766*c*-2 may awarded to a player having been referred to the third game 760*c*, for example, upon the "buddy" logging into, joining, registering for, and/or initiating play of a game session of the third game 760*c* and/or the second bonus amount 766*c*-2 may be provided to the "buddy" in the case that the "buddy" earns and/or obtains the third win amount 768*c*. In some embodiments, the bonus amounts 766*c*-1, 766*c*-2, 766*c*-3, 766*c*-4, 766*c*-5, 766*c*-6 may be based on the number of players of the third game 760*c*, the number of related/referral players and/or types thereof in the third game 760*c* (e.g., as depicted by the third, fourth, and fifth bonus amounts 766*c*-3, 766*c*-4, 766*c*-5), the third wager amount 762*c*, and/or the third win amount 768*c* (e.g., a multiplier thereof).

According to some embodiments, implementation of a referral bonus feature may cause an alteration and/or setting of various game parameters. While a typical "non-progressive" game such as the second game 760*b* may be configured to provide the second win amount 768*b* of eighty (80) units, for example, a group RAF version of the second game 760*b*—e.g., the third game 760*c*—may be altered and/or configured to provide, instead, the third win amount 768*c* of seventy (70) units. The ten (10) unit difference may, for example, be implemented to account for the possibility that group RAF players (i.e., "daddies" and "buddies") may earn and/or achieve one or more of the third group RAF bonuses 716*c*. Similarly, a typical "progressive" game such as the first game 760*a* in some embodiments, may be altered and/or configured to provide the third win amount 768*c* instead of the first win amount 768*a* (and/or the first progressive win amount 764*a* may be modified to become the third progressive win amount 764*c* and/or the first group RAF bonus amounts 766*a* may be altered to becomes the third group RAF bonus amounts 766*c*).

In some embodiments, the first game 760*a* and/or the second game 760*b* may be actively altered and/or reconfigured to define the third game 760*c*. The first game 760*a* may be configured as depicted in FIG. 7, for example, but may be reconfigured as depicted by the path "A" upon an occurrence of one or more triggering events. In the case that the first game 760*a* is populated by a plurality of group RAF players, for example, the third group RAF bonuses 766*c* may be implemented (e.g., to reward player referrals and/or coordinated playing), the third progressive win amount 764*c* may be implemented (e.g., effectively removing the progressive feature from the game), and/or the third win amount 768*c* may be implemented (e.g., actually increasing the standard win for a game session). In accordance with such an embodiment, the first game 760*a* may be transformed and/or converted into the third game 760*c*. This may occur in a variety of manners such as by switching players of the first game 760*a* from a first game room (not separately depicted) to a third game room (also not separately depicted) or by modifying the game parameters within a single game room.

Similarly, the second game 760*b* may be configured as depicted in FIG. 7, for example, but may be reconfigured as depicted by the path "B" upon an occurrence of one or more triggering events. Upon a win by a group RAF player in the second game 760*b*, for example, the game parameters may be altered to achieve the third game 760*c* (e.g., within the same game room/server). In some embodiments, reconfiguration may occur between game sessions. A first game session of the second game 760*b* may be conducted, for example, in which a plurality of group RAF players have joined and/or played. Based on their presence (generally or specifically, such as based on the number and/or configuration of such players in the second game 760*b*) the second game 760*b* may be converted to the third game 760*c* for the next/subsequent game session. In such a manner, for example, the makeup of players in a given game 760*a-c* and/or game room may affect the game parameters implemented in subsequent sessions of the same game and/or games in the same room or on the same server. In some embodiments, the presence of certain payers having per-defined relationships (e.g., referrals, "friends", adversaries, stat-based groupings) in a first game session may cause a subsequent game session to be reconfigured. In the example of FIG. 7, for example, the win amounts 768*a* may be adjusted and/or the group RAF bonuses 766*a-c* may be implemented.

According to some embodiments, the games 760*a-c* may comprise multiplayer online games such as the depicted bingo, poker, sports simulation games, strategy games, first-person shooter games, role-playing games, etc. In some embodiments, the games 760*a-c* may comprise wagering games, games of chance, games of skill, and/or hybrids thereof. In some embodiments, the win amounts 768*a-c* may comprise and/or define benefits conferred upon a limited set of players in a single session of the games 760*a-c*. A single session of the second game 760*b* may, for example, involve a plurality of players (not shown in FIG. 7) playing adversarially and/or cooperatively to obtain the second win amount 768*b*. In some embodiments, the second win amount 768*b* may be provided to a single "winner" (in skill, chance, and/or both) of the session of the second game 760*b* or may be provided to a subset of the top ranked players at the end of game play (each such player may receive the second win amount 768*b*, for example, or the second win amount 768*b* may be split amongst such players evenly, randomly, and/or in a pro rata or other distribution fashion).

Figure 8:
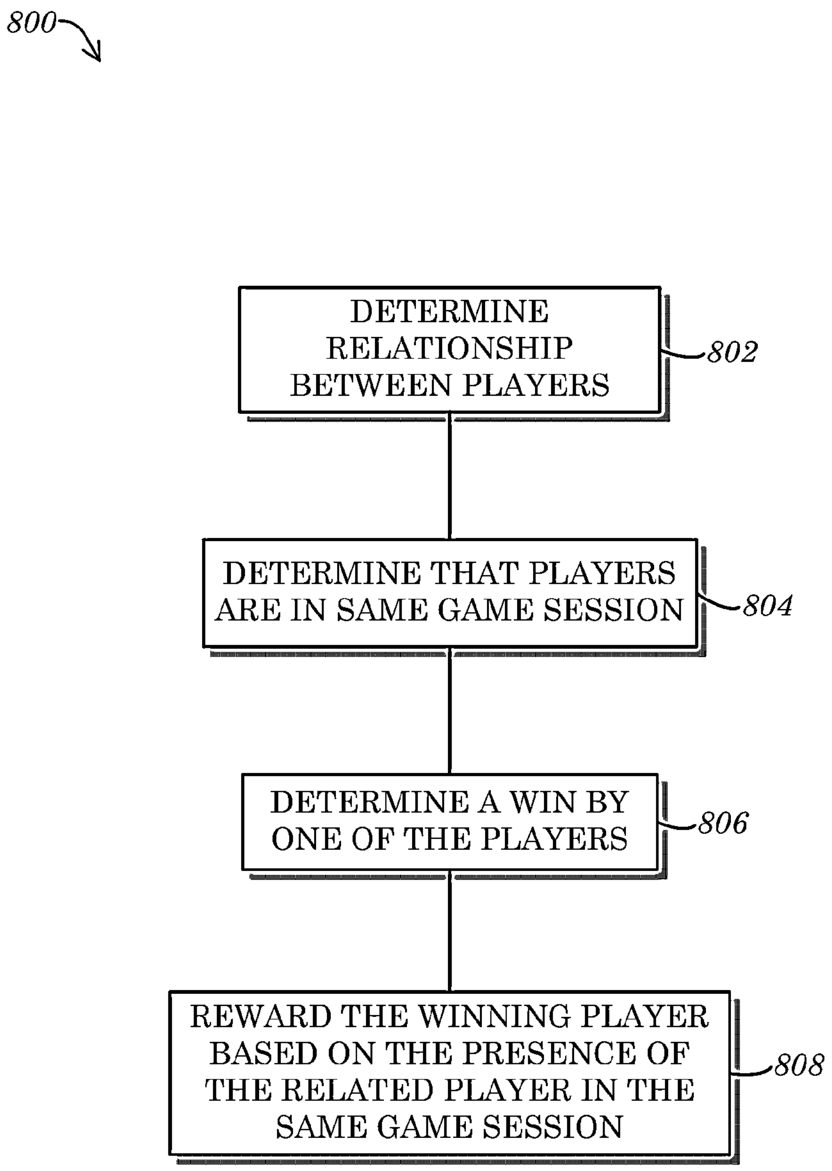
FIG. 8 is a flow diagram of a method according to some embodiments.

Turning to FIG. 8, a flow diagram of a method 800 according to some embodiments is shown. In some embodiments, the method 800 may be performed and/or implemented by and/or otherwise associated with one or more specialized and/or computerized processing devices (e.g., the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein), specialized computers, computer terminals, computer servers, computer systems and/or networks, and/or any combinations thereof (e.g., by one or more online gaming company and/or online gaming player processing devices). In some embodiments, the method 800 may be embodied in, facilitated by, and/or otherwise associated with various input mechanisms and/or interfaces such as the interfaces 920*a-e* of FIG. 9A, FIG. 9B, FIG. 9C, FIG. 9D, and/or FIG. 9E, herein.

The process and/or flow diagrams described herein do not necessarily imply a fixed order to any depicted actions, steps, and/or procedures, and embodiments may generally be performed in any order that is practicable unless otherwise and specifically noted. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In some embodiments, the method 800 may comprise determining a relationship between players, at 802. An electronic and/or computerized processing device and/or controller device may, for example, identify, lookup, derive, and/or otherwise determine that two or more players are related. In some embodiments, the players may be related by nature of a first one of the players having referred a second one of the players to an online gaming system. In some embodiments, players may be related by nature of a stored indication that the players are "friends"—e.g., within an online gaming system/account system and/or within and/or via one or more social media systems and/or accounts such as Facebook®, Twitter®, etc. In some embodiments, the relationship may be determined by receiving one or more indications from one or more of the players. A first and/or referring player may "invite" the other player(s) to the system (and/or to a specific game room and/or session) via an interface provided by the system, for example, such that the system is privy to an identifier of the invited player (as well as an identifier of the inviting/referring player). In the case that the invited player responds (e.g., directly to the invite, such as by clicking on a hyperlink and/or indirectly), the system may utilize identifying information of the responding player to determine that the invited player is related to the inviting player.

In some embodiments, the inviting and/or referred player may provide a code and/or other identifier to the system, e.g., upon registration and/or otherwise. The system may utilize the code and/or identifier to identify the referring/inviting player and accordingly define and/or establish a relationship there between. In some embodiments, third-party systems and/or websites or devices may be queried and/or accessed to determine a relationship between players. The system may, for example, search a third-party account system (e.g., Facebook®) to determine which registered online game players are related via such a third-party system. In some embodiments, players may then be contacted and/or prompted to carry-over such third-party relationships into the gaming account system. In some embodiments, such third-party relationships may be determined by receiving a query and/or prompt from and/or via such a third-party system. A player may utilize a third-party account system to request and/or notify the gaming system of a third-party relationship between players, for example.

According to some embodiments, the method 800 may comprise determining that the players are in the same game session, at 804. With respect to a game such as an online game, a multiplayer game, a wagering game, a skill game, and/or any combinations thereof, for example, it may be determined that the related players are logged into, have joined, are registered for, and/or are playing in a particular game session (e.g., an instance of a game), game room, and/or on a particular game server. Player identifiers for players in a particular game session and/or room may be cross-references and/or checked, for example, to determine that two or more of the players are related. In some embodiments, the nature of the relationship may be determined. It may be determined, for example, that the players are related as a referring player (e.g., a "Sugar Daddy") and a referred player (e.g., a "Sugar Buddy"), as social networking "friends" (and/or family), and/or as players selected by the system as being related (e.g., to incent such players to play together). According to some embodiments, such as in the case that more than two (2) related players are determined to be in the same session/room, it may be determined how many related players (and/or related players of certain tiers and/or classes) are in the same session/room (e.g., it may be determined that a single "Sugar Daddy" and two (2) "Sugar Buddies" are playing the same game session).

In some embodiments, the method 800 may comprise determining a win by one of the players, at 806. The gaming system may, for example, determine that one or more conditions required for achieving a win condition (due to skill and/or chance) have been satisfied with respect to one or more players (e.g., as part of an execution of a game program and/or procedure). In some embodiments, the win may comprise an ultimate and/or concluding win for a game session. Such a win may be earned solely by a single winning player and/or team or may be distributed in some fashion amongst a subset of the highest ranking and/or top-rated players having finished and/or completed the game session. In some embodiments, the win may comprise an intermediate, non-final and/or non-conclusory, and/or other win and/or winning event and/or outcome. The win may comprise, for example, an achievement earned and/or obtained via game play in the game session such as a rate of play, number of "kills", team cooperative-play points (and/or other team-based metrics), etc. In some embodiments, it may be determined that two (2) or more related players (e.g., two or more referral-related players) have achieved a winning condition.

According to some embodiments, the method 800 may comprise rewarding the winning player based on the presence of the related player in the same game session, at 808. In some embodiments, the rewarding may be conducted in response to the determining of the win by the one of the players at 806. The winning player, for example, may be awarded a prize based on a successful completion of the game session and/or may receive an additional prize and/or consideration based on the presence of the related player(s) in the session that has been won. In some embodiments, a single prize may be awarded but may be selected (e.g., from a pool of available prizes) and/or defined (e.g., in terms of magnitude and/or type) based on the presence of the related player(s) in the same game session as the winning player. In some embodiments, such as in the case that the win comprises an intermediate win and/or an in-game achievement (e.g., as opposed to a conclusory and/or game session-ending win), an in-game bonus, feature, capability, and/or item may be selected and/or provided based on the achievement occurring in the presence of the related player(s).

In some embodiments, the rewarding may be conducted in response to the determining that the players are in the same game session at 804. One or more of the related players may be rewarded even in the absence of a win, for example, such as upon initiating play of the same game session, entering the same game room, and/or performing some joint action in the game session. According to some embodiments, the rewarding may be based on a number and/or type of related players in the same game session and/or room (and/or a number of related players that achieve one or more win conditions in the game session/room). A winning player having played with zero (0) related players in the same session may receive a default and/or standard prize, for example, while in the case that one (1) related player was present for the win (and/or during at least a portion of the game play of the session) a higher-magnitude and/or different prize may be awarded, and/or in the case that three (3) related players were present to "witness" the win an even higher-magnitude prize and/or different prize and/or prize type may be provided to the winning player. In some embodiments, certain numbers and/or combinations of relationship types may be promoted by enhancing awards for players playing in game sessions (and/or winning such game sessions) where such combinations occur.

In some embodiments, the rewarding may occur after an initial game session in which it is determined (e.g., at 804) that the related players are present. Player lists from a first game session may influence and/or dictate or define game parameters (e.g., win amounts, bonus amounts, and/or progressive settings) for subsequent game sessions, for example. In some embodiments, such game parameter changes may take place in a given game room, server, and/or for a particular game type, class, and/or tournament and be applied to subsequent tournaments. In some embodiments, such changes may be effectuated regardless of whether the player list stays the same. The subsequent game session may, for example, have a different player composition (e.g., may not include the related players and/or the same related players) yet may nevertheless be altered based on the player composition from the previous session.

Turning now to FIG. 9A, FIG. 9B, FIG. 9C, FIG. 9D, and FIG. 9E, example user interfaces 920*a-e* according to some embodiments are shown. In some embodiments, the user interfaces 920*a-e* may comprise one or more web pages, web forms, web browser plug-ins and/or add-ins, database entry forms, API tools, spreadsheets, tables, and/or applications or other GUI tools via which a user may participate in, conduct, and/or manage one or more online games. The user interfaces 920*a-e* may, for example, comprise a front-end of an online gaming portal program and/or platform programmed and/or otherwise configured to execute, conduct, and/or facilitate the method 800 of FIG. 8 and/or portions or combinations thereof described herein. In some embodiments, the user interfaces 920*a-e* may be output via a computerized and/or electronic device such as one or more of the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein.

Figure 9A:
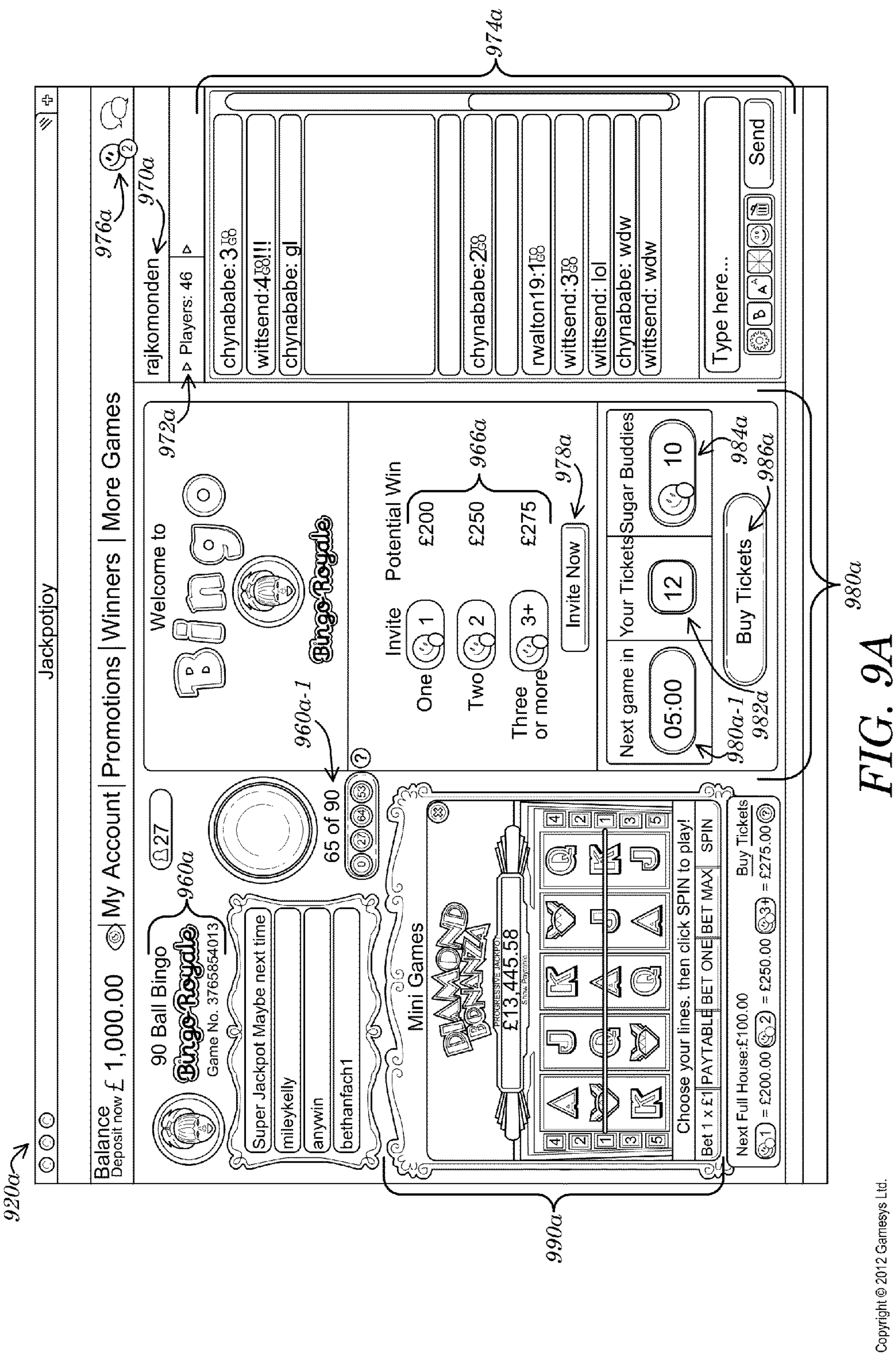
FIG. 9A, FIG. 9B, FIG. 9C, FIG. 9D, and FIG. 9E are example interfaces according to some embodiments.

According to some embodiments, and referring specifically to FIG. 9A, a first user interface 920*a* may comprise one or more tabs and/or other segmented and/or logical-presented data forms and/or fields. In some embodiments, the first user interface 920*a* may be configured and/or organized to provide a user (e.g., a player and/or customer) with information related to an online game. In the example first user interface 920*a* of FIG. 9A, for example, the first interface 920*a* may indicate that the information provided via the first interface 920*a* is descriptive of a particular bingo game 960*a* (e.g., a "90 Ball Bingo—Bingo Royale" and/or "Game No. 3765854013"). The particular bingo game 960*a* may, for example, comprise a particular game session, a particular game "room", a particular game tournament, and/or may otherwise specifically and/or uniquely identify a particular instance of a game, game type, and/or game activity. In some embodiments, the first user interface 920*a* may display information descriptive of the particular bingo game 960*a* such as a ball indicator 960*a*-1 and/or a group RAF win indicator 966*a*.

The ball indicator 960*a*-1 may, for example, represent a progression of the particular bingo game 960*a* (e.g., sixty-five (65) balls out of a total ninety (90) balls have been drawn/played) and/or the group RAF win indicator 966*a* may represent and/or convey potential winnings (e.g., a pay table) based on how many related players—e.g., "Buddies"—are joined and/or playing in the particular bingo game 960*a*. As depicted, for example, the group RAF win indicator 966*a* may convey that the potential win amount is two hundred (200) units (e.g., dollars, pounds, points) in the case that one (1) "Buddy" is in the particular bingo game 960*a* (e.g., the "same" game/game session/room that the user of the first interface 920*a* is joined and/or playing in), the potential win amount is increased to two hundred and fifty (250) units in the case that two (2) "Buddies" are in the particular bingo game 960*a*, and/or the potential win amount is increased to two hundred and seventy-five (275) units in the case that three (3) or more "Buddies" are in the particular bingo game 960*a*.

In some embodiments, the first interface 920*a* may provide an indication of the current player/user 970*a* (e.g., a screen name and/or other identifier) and/or an indication of a total number of players 972*a*. In some embodiments, the total number of players 972*a* may comprise a total number of players that are online and/or otherwise available to play, a total number of registered players (e.g., players having accounts), and/or a total number of players in a lobby and/or room associated with the particular bingo game 960*a*. In some embodiments, the first interface 920*a* may provide a chat interface 974*a* via which the current player 970*a* may initiate and/or conduct communications (e.g., textual and/or otherwise) with any or all of the players from the total number of players 972*a* (e.g., certain groups of players, certain selected players, etc.).

According to some embodiments, the first interface 920*a* may provide an indication of a number of related players 976*a* associated with the particular bingo game 960*a*. The related players 976*a* may, for example, comprise referral and/or friend players that have joined a particular game room in and/or via which the particular bingo game 960*a* is conducted and/or that have joined in and/or are playing the particular bingo game 960*a*. As depicted by the indication of the related players 976*a* in FIG. 9A, there may be two (2) related players 976*a* associated with the particular bingo game 960*a*, which may, for example, qualify the current player 970*a* for the mid-range group RAF bonus 966*a* of two hundred and fifty (250) units. In some embodiments, the first interface 920*a* may comprise an invite button 978*a*. The invite button 978*a* may be utilized by the current player 970*a*, for example, to invite one or more players from the total number of players 972*a* to play in the particular bingo game 960*a*. In the case that such an invited player comprises a related player 976*a*, the current player 970*a* may then qualify for the highest group RAF bonus 966*a* of two hundred and seventy-five (275) units (i.e., having achieved three (3) or more "Buddies"/related players in the same particular bingo game 960*a*—presuming the invite is accepted by the "Buddy").

In some embodiments, the first interface 920*a* may comprise a portion indicating information descriptive of a subsequent and/or next game session 980*a*. The first interface 920*a* may display, for example, a timer 980*a*-1 displaying the amount of time until the next game session 980*a* starts may be provided, for example, a total number of tickets 982*a* (e.g., entries, credits, health, buy-in, etc.) currently purchased for the next game session 980*a*, and/or a total number of "Sugar Buddies" 984*a* currently registered for the next game session 980*a*. In some embodiments, the first interface 920*a* may comprise a purchase button 986*a* that allows the current player 970*a* (and/or user of the first interface 920*a*) to manage the amount of tickets (credits, wagers, etc.) that the current player 970*a* (and/or user) has dedicated and/or committed to the next game session 980*a*.

According to some embodiments, the first interface 920*a* may comprise a mini-game portion 990*a*. The mini-game portion 990*a* may provide, for example, a second and/or secondary game via the first interface 920*a* (e.g., a second game provided via a single game room). In some embodiments, the mini-game portion 990*a* may provide a secondary game that is distinct from the particular bingo game 960*a* (such that, for example, results from the mini-game portion 990*a* do not affect results from the particular bingo game 960*a*). According to some embodiments, the mini-game portion 990*a* may provide a secondary game that is related to the particular bingo game 960*a* (such that, for example, results from the mini-game portion 990*a* affect results from the particular bingo game 960*a*). According to some embodiments, the mini-game portion 990*a* may also or alternatively by affected by the number of related players 976*a*.

Figure 9B:
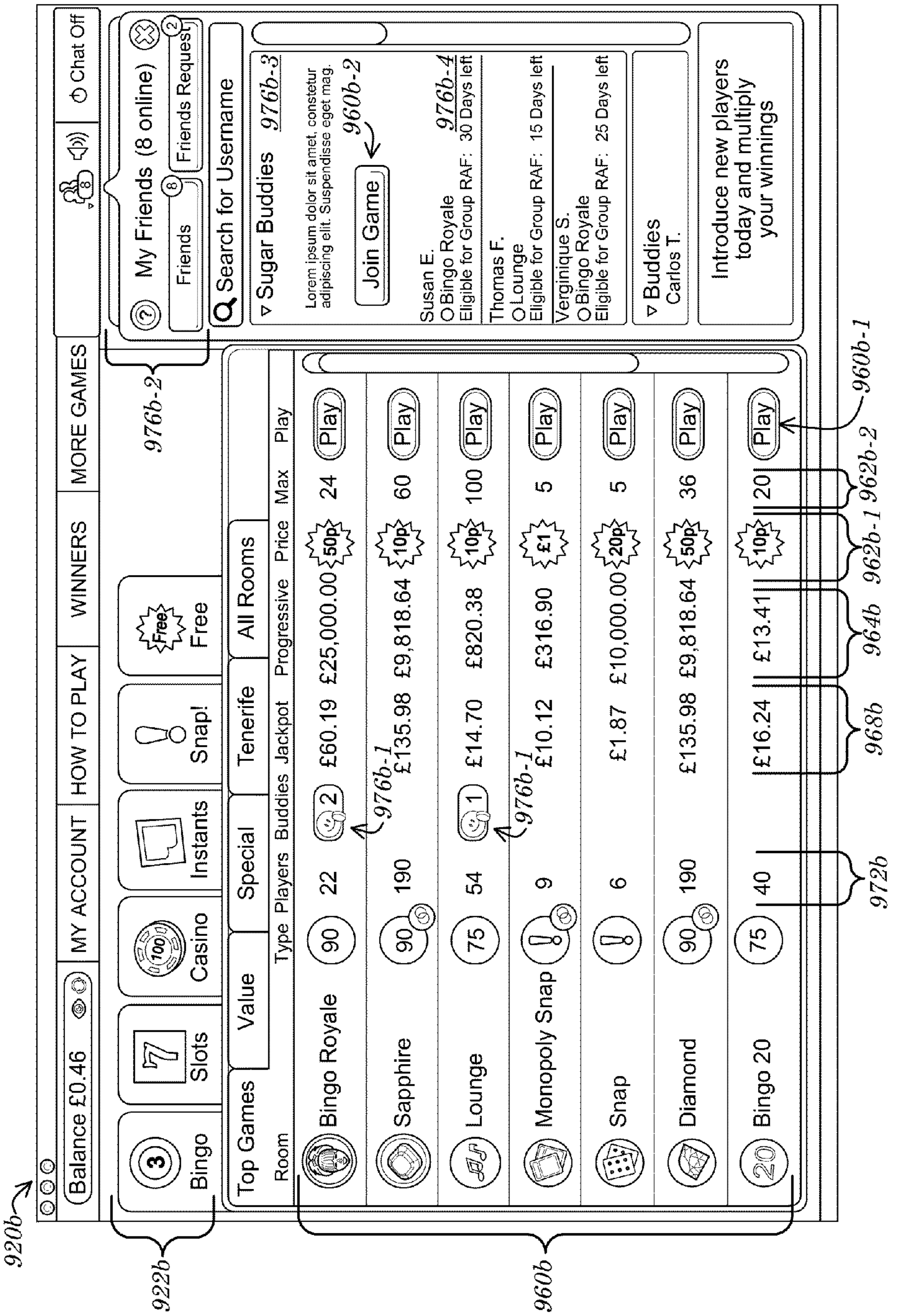

In some embodiments, and referring specifically to FIG. 9B, a second user interface 920*b* may also or alternatively comprise one or more tabs and/or other segmented and/or logical-presented data forms and/or fields. In some embodiments, the second user interface 920*b* may comprise a game type selection portion 922*b* via which one or more tabs and/or other graphical representations that may be interfaced with (e.g., via user input/selections) to select a particular type of game that is desired. In some embodiments, the second user interface 920*b* may list a plurality of available game rooms 960*b* (e.g., the "Top Games", as depicted in the example of FIG. 9B, and/or other list categories such as based on game and/or room characteristics, user preferences, "favorites", etc.). In some embodiments, a user may select one or more of the available game rooms 960*b* to enter and/or play in via one or more "Play" buttons 960*b*-1.

According to some embodiments, the second user interface 920*b* may display (e.g., for each of the available game rooms 960*b*) a price 962*b*-1, a maximum 962*b*-2 (e.g., number of players, wager size, number of wagers, etc.), a progressive amount 964*b*, a jackpot or win amount 968*b*, and/or a total number of players 972*b* (e.g., currently joined in, registered for, and/or playing in the particular available game room 960*b*). In some embodiments, the second user interface 920*b* may provide an indication of a number of "Buddies" 976*b*-1 in each of the available game rooms 960*b*.

In some embodiments, the second user interface 920*b* may provide an indication of "Friends" 976*b*-2, "Sugar Buddies" 976*b*-3, and/or "Buddies" 976*b*-4. Different categories, tiers, and/or types of relationships may exist, for example, between a player and one or more other players and/or groups of players. "Friends" 976*b*-2 may comprise a first and/or basic tier of related players, for example, while "Sugar Buddies" 976*b*-3 and/or "Buddies" 976*b*-4 may comprise secondary and/or more specific and/or particular types of sub-relationships amongst the "Friends" 976*b*-2. "Sugar Buddies" 976*b*-3, for example, may comprise "Friends" 976-2 (and/or others) that have been referred by a first player (e.g., a "Sugar Daddy" and/or a current user of the second user interface 920*b*). In some embodiments, bonuses, win amounts, and/or other game parameters may be based on (or altered based on) whether a "Friend" 976*b*-2, "Sugar Buddy" 97*b*-3, and/or "Buddy" 976*b*-4 (and/or based on a number of such related players) is playing in the same available game room 960*b* as a first player/user. In some embodiments, such as to facilitate play of a game with one or more related players, a "Join Game" button 960*b*-2 may be provided that allows quick and easy access to the available game room 960*b* in which a particular related player (and/or group thereof) is playing. As depicted in FIG. 9B, group RAF bonuses (and/or other game parameters) based on referred players may be limited to a particular time window, such as for a particular period after a referral (and/or qualifying event) occurs.

Figure 9C:
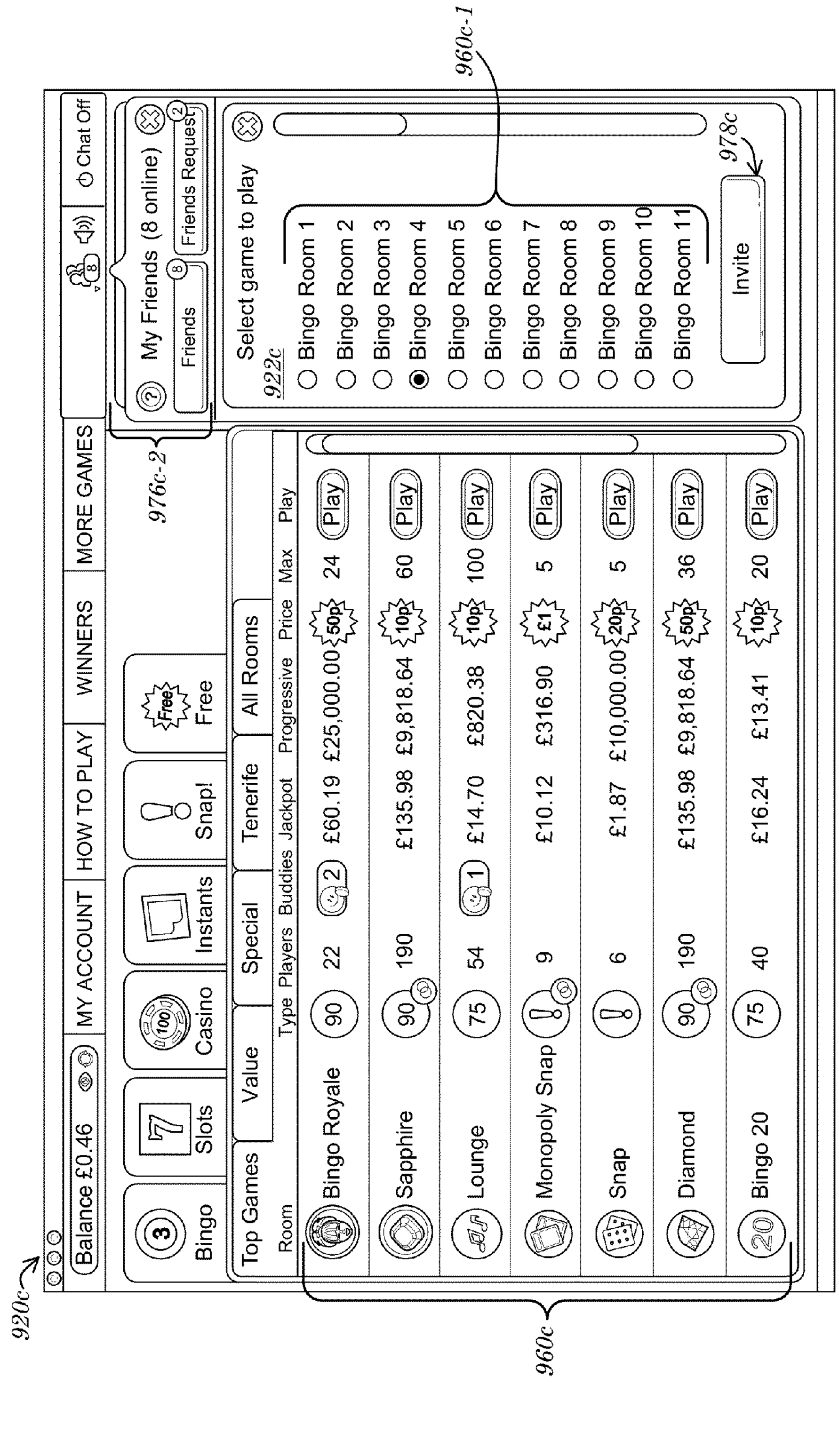

According to some embodiments, and referring specifically to FIG. 9C, a third user interface 920*c* may also or alternatively comprise one or more tabs and/or other segmented and/or logical-presented data forms and/or fields. In some embodiments, the third user interface 920*c* may comprise a listing of games 960*c* and/or may provide a menu 922*c* via which particular game rooms 960*c*-1 may be selected. In some embodiments, the menu 922*c* may be associated with and/or tied to one or more related players 976*c*-2 (e.g., "Friends", "Sugar Buddies", etc.). The menu 922*c* may, for example, provide an invite button 978*c* that causes an invitation to be sent to one or more selected related players 976*c*-2 (the selection of which is not explicitly shown in FIG. 9C). In such a manner, for example, a user may quickly and easily invite a related player 976*c*-2 to a particular game room 960*c*-1 (e.g., to gain an opportunity for the user (and/or friend, buddy, etc.) to qualify for a group RAF bonus and/or other special related player parameter and/or benefit).

Figure 9D:
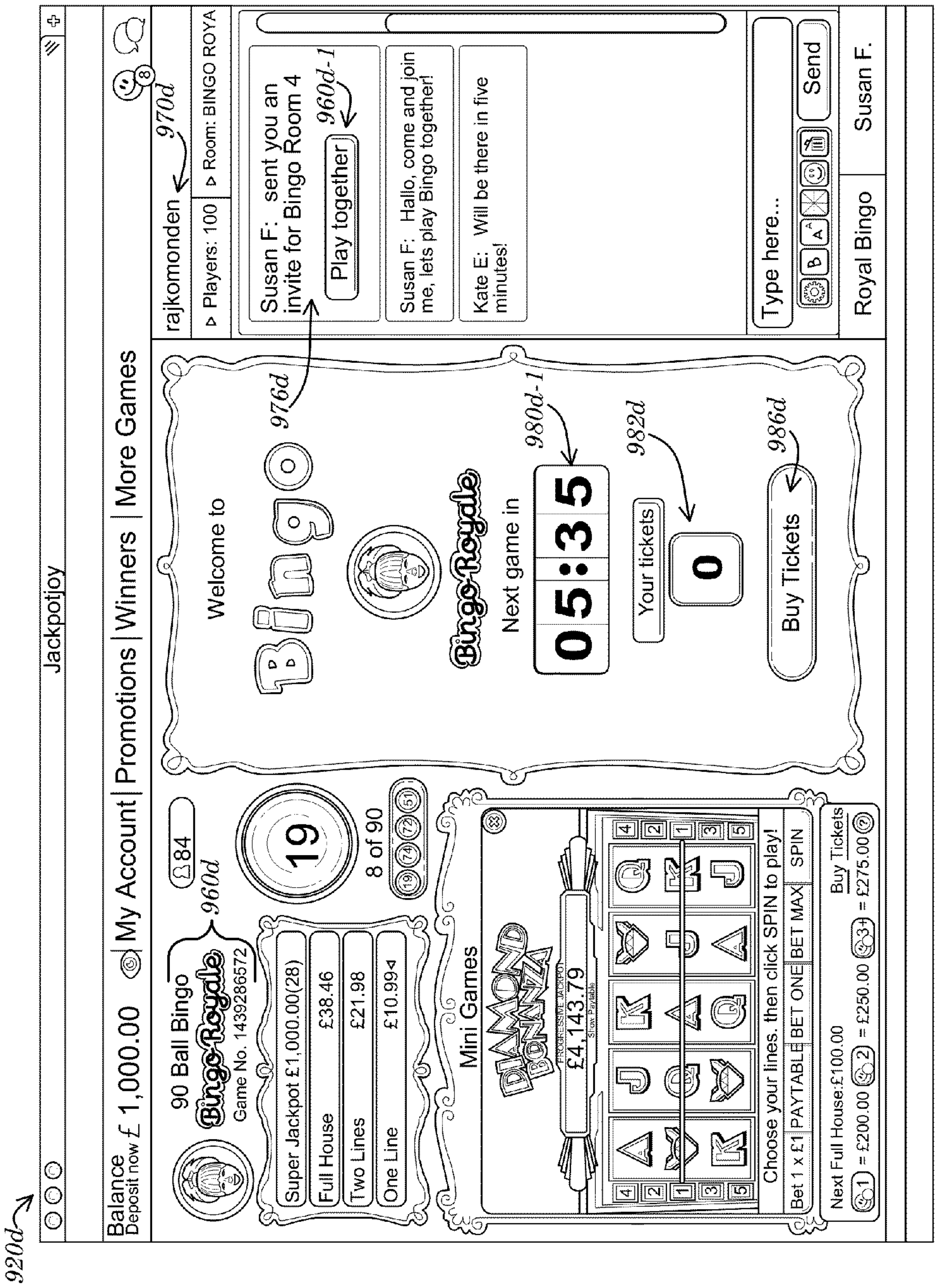

In some embodiments, and referring specifically to FIG. 9D, a fourth user interface 920*d* may also or alternatively comprise one or more tabs and/or other segmented and/or logical-presented data forms and/or fields. In some embodiments, the fourth user interface 920*d* may comprise an indication of a particular game room 960*d* (e.g., "Game No. 1439286572"). Within the particular game room 960*d* (e.g., represented by the fourth user interface 920*d*) game sessions may be initiated, played, and/or concluded in a serial fashion. In some embodiments, a subsequent or next game session may be indicated by a timer 980*d*-1. The fourth user interface 920*d* may, for example, display a ticket counter 982*d* for the next session and/or provide a ticket purchase button 986*d* that permits a user of the fourth user interface 920*d* to purchase tickets for the next session. In some embodiments, the fourth user interface 920*d* may provide an indication that a current player 970*d* has received an invite 976*d* from another player (e.g., a friend, buddy, referral, etc.). In some embodiments, the fourth user interface 920*d* may provide a "Play Together" button 960*d*-1 that allows the user (e.g., the current player 970*d*) to accept the invite 976*d* and join the other player in the indicated game room/session. In the example of FIG. 9D, the invite 976*d* to "Bingo Room 4" may have been initiated by a player/user via the menu 922*c* and/or the invite button 978*c* of the third user interface 920*c* of FIG. 9C (e.g., where "Bingo Room 4" is indicted as being selected as a room to which to invite one or more other players).

Figure 9E:
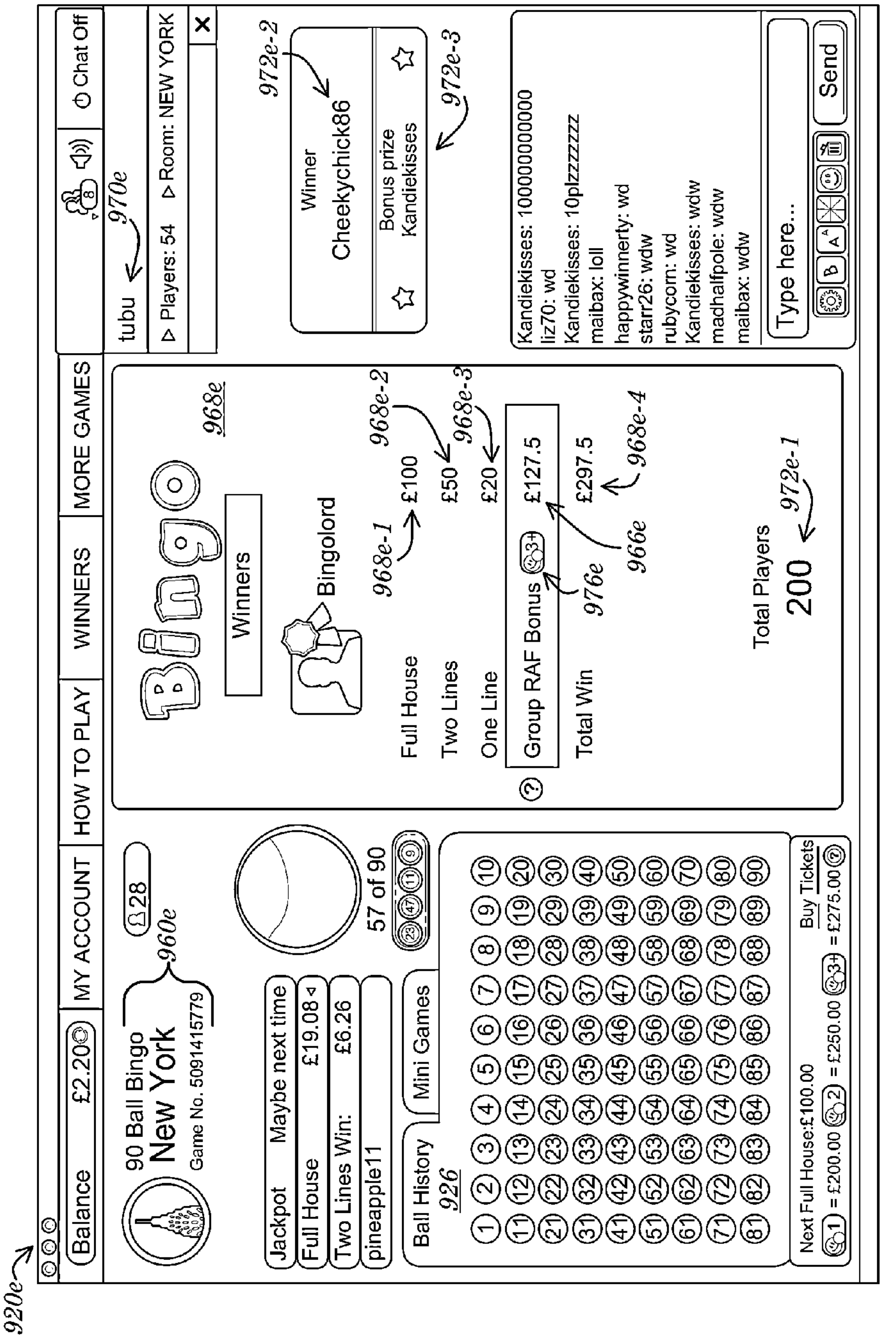

According to some embodiments, and referring specifically to FIG. 9E, a fifth user interface 920*e* may also or alternatively comprise one or more tabs and/or other segmented and/or logical-presented data forms and/or fields. In some embodiments, the fifth user interface 920*e* may represent activity and/or results of a particular bingo game session 960*e*. The fifth user interface 920*e* may display a bingo ball history 960*e*-1 of the particular bingo game session 960*e*, for example, and/or may indicate other game result and/or characteristic data. The fifth user interface 920*e* may, in some embodiments, indicate to a particular player 970*e* (i) a total number of players 972*e*-1 in the particular bingo game session 960*e*, (ii) a winner 972*e*-2 of the particular bingo game session 960*e* or a previous session, (iii) a bonus prize winner 972*e*-3 of the particular bingo game session 960*e* or a previous session, and/or (iii) details of a wining payout 968*e*. The winning payout 968*e* may comprise an actual payout or an estimated (e.g., maximum or best-case scenario) payout for the particular bingo game session 960*e* (and/or an upcoming session). In some embodiments, the winning payout 968*e* may comprise a first win portion 968*e*-1 (e.g., a "Full House" payout), a second win portion 968*e*-2 (e.g., a "Two Lines" payout), a third win portion 968*e*-3 (e.g., a "One Line" payout), a group RAF bonus 966*e*, and/or may indicate a total win amount 968*e*-4 (e.g., all "standard" game payouts plus the group RAF bonus 966*e*). As depicted in FIG. 9E, the group RAF bonus 966*e* may be based on a number of related players (e.g., group RAF players; upstream and/or downstream referral players).

While the example user interfaces 920*a-e* are depicted herein with respect to a specific example of a bond product portal, other products, portals, searches, and/or other functionalities may be provided in accordance with some embodiments. While the depicted underwriting product comprises a bond product, for example, other underwriting products such as insurance and/or surety products may also or alternatively be utilized by and/or incorporated into the user interfaces 920*a-e*.

While various components of the interfaces 920*a-e* of FIG. 9A, FIG. 9B, FIG. 9C, FIG. 9D, and FIG. 9E have been described with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

Figure 10:
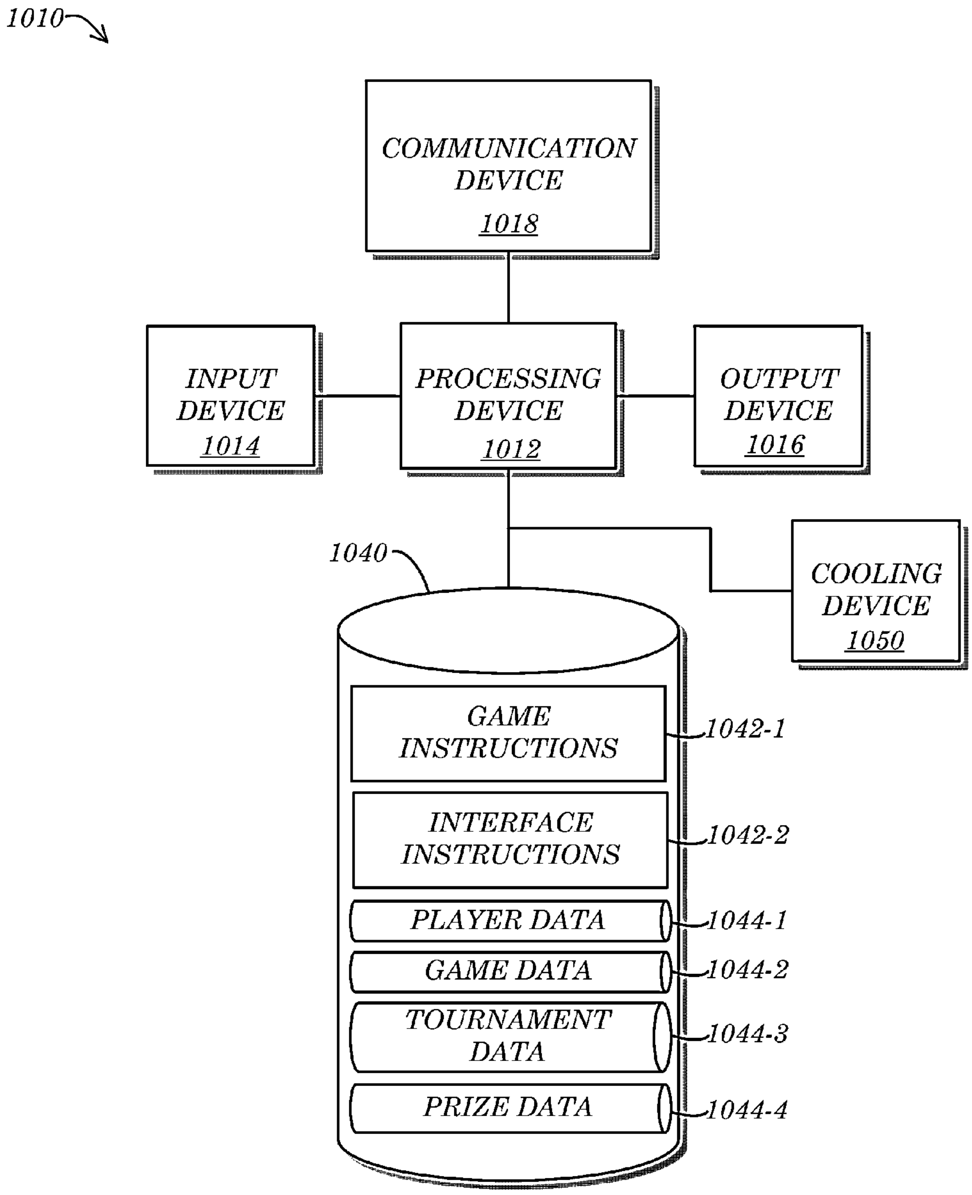
FIG. 10 is a block diagram of an apparatus according to some embodiments.
Figure 11A:
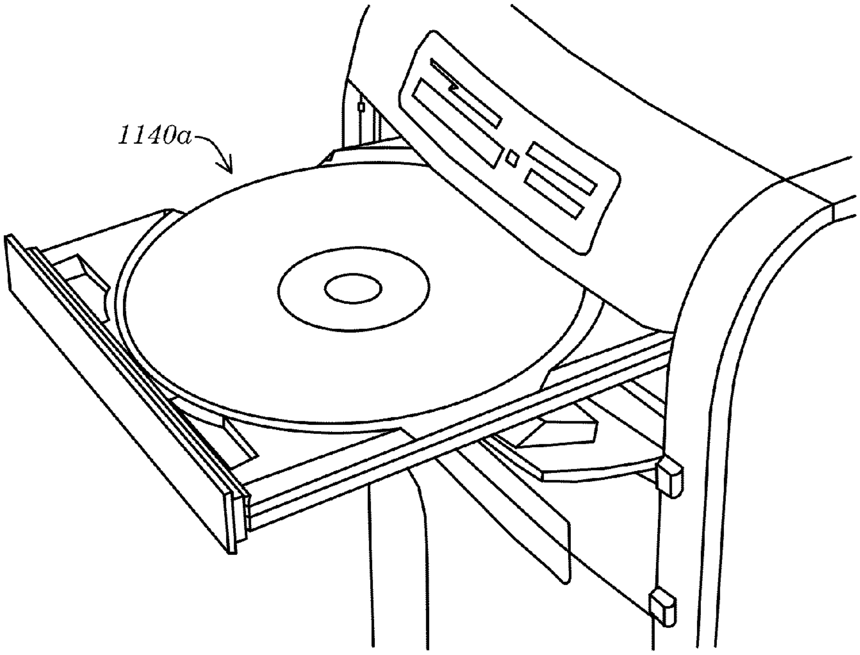
FIG. 11A, FIG. 11B, FIG. 11C, and FIG. 11D are perspective diagrams of exemplary data storage devices according to some embodiments.
Figure 11B:
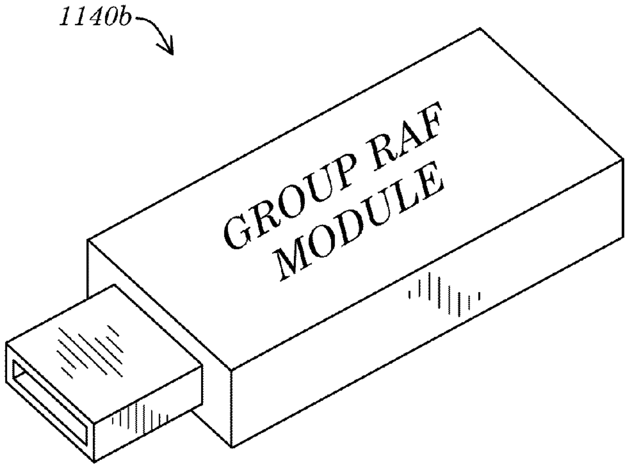
Figure 11C:
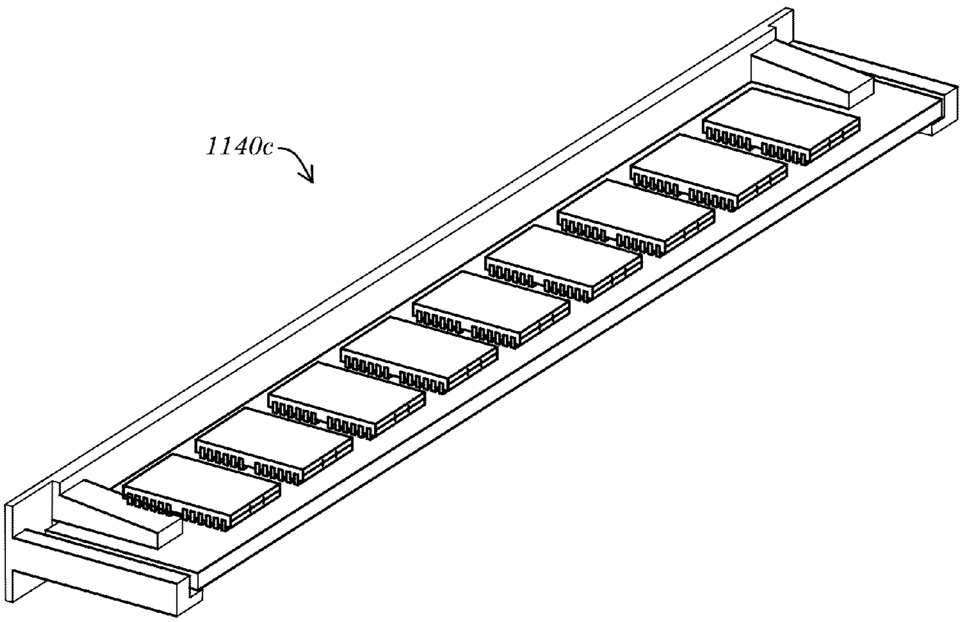
Figure 11D:
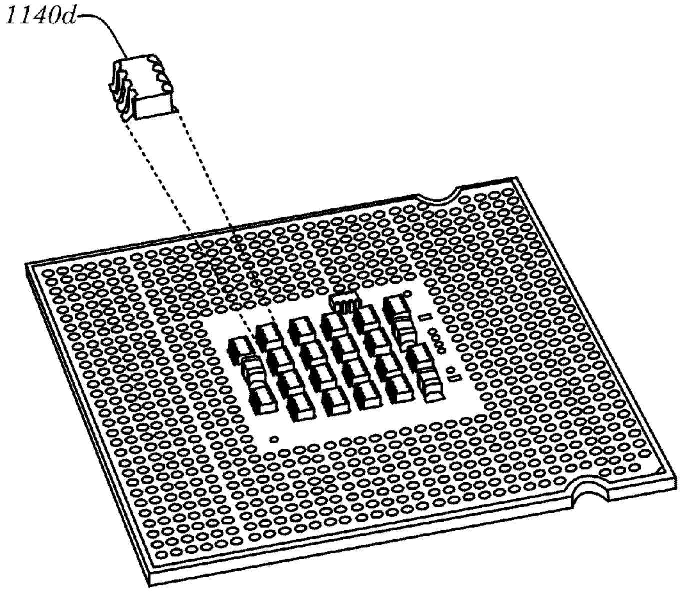

Turning to FIG. 10, a block diagram of an apparatus 1000 according to some embodiments is shown. In some embodiments, the apparatus 1000 may be similar in configuration and/or functionality to any of the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein, and/or may otherwise comprise a portion of the systems 100, 200, 300, 400, 500 of FIG. 1, FIG. 2, FIG. 3, FIG. 4, and/or FIG. 5 herein. The apparatus 1000 may, for example, execute, process, facilitate, and/or otherwise be associated with the method 800 described in conjunction with FIG. 8 herein. In some embodiments, the apparatus 1000 may comprise a processing device 1012, an input device 1014, an output device 1016, a communication device 1018, a memory device 1040, and/or a cooling device 1050. According to some embodiments, any or all of the components 1012, 1014, 1016, 1018, 1040, 1050 of the apparatus 1000 may be similar in configuration and/or functionality to any similarly named and/or numbered components described herein. Fewer or more components 1012, 1014, 1016, 1018, 1040, 1050 and/or various configurations of the components 1012, 1014, 1016, 1018, 1040, 1050 be included in the apparatus 1000 without deviating from the scope of embodiments described herein.

According to some embodiments, the processing device 1012 may be or include any type, quantity, and/or configuration of electronic and/or computerized processor that is or becomes known. The processing device 1012 may comprise, for example, an Intel® IXP 2800 network processor or an Intel® XEON™ Processor coupled with an Intel® E7501 chipset. In some embodiments, the processing device 1012 may comprise multiple inter-connected processors, microprocessors, and/or micro-engines. According to some embodiments, the processing device 1012 (and/or the apparatus 1000 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 1000 comprises a server such as a blade server, necessary power may be supplied via a standard AC outlet, power strip, surge protector, a PDU, and/or Uninterruptible Power Supply (UPS) device.

In some embodiments, the input device 1014 and/or the output device 1016 are communicatively coupled to the processing device 1012 (e.g., via wired and/or wireless connections and/or pathways) and they may generally comprise any types or configurations of input and output components and/or devices that are or become known, respectively. The input device 1014 may comprise, for example, a keyboard that allows an operator of the apparatus 1000 to interface with the apparatus 1000 (e.g., by a player, such as to participate in an online game session as described herein). In some embodiments, the input device 1014 may comprise a sensor configured to provide information such as player relationships to the apparatus 1000 and/or the processing device 1012. The output device 1016 may, according to some embodiments, comprise a display screen and/or other practicable output component and/or device. The output device 1016 may, for example, provide a game interface (not explicitly shown in FIG. 10; e.g., the interfaces 920*a-e* of FIG. 9A, FIG. 9B, FIG. 9C, FIG. 9D, and FIG. 9E) to a player (e.g., via a website). According to some embodiments, the input device 1014 and/or the output device 1016 may comprise and/or be embodied in a single device such as a touch-screen monitor.

In some embodiments, the communication device 1018 may comprise any type or configuration of communication device that is or becomes known or practicable. The communication device 1018 may, for example, comprise a network interface card (NIC), a telephonic device, a cellular network device, a router, a hub, a modem, and/or a communications port or cable. In some embodiments, the communication device 1018 may be coupled to provide data to a player device (not shown in FIG. 10), such as in the case that the apparatus 1000 is utilized to provide a game interface to a player as described herein. The communication device 1018 may, for example, comprise a cellular telephone network transmission device that sends signals indicative of game interface components to customer and/or subscriber handheld, mobile, and/or telephone device. According to some embodiments, the communication device 1018 may also or alternatively be coupled to the processing device 1012. In some embodiments, the communication device 1018 may comprise an IR, RF, Bluetooth™, and/or Wi-Fi® network device coupled to facilitate communications between the processing device 1012 and another device (such as a player device and/or a third-party device).

The memory device 1040 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 1040 may, according to some embodiments, store one or more of game instructions 1042-1 and/or interface instructions 1042-2. In some embodiments, the game instructions 1042-1 and/or the interface instructions 1042-2 may be utilized by the processing device 1012 to provide output information via the output device 1016 and/or the communication device 1018.

According to some embodiments, the game instructions 1042-1 may be operable to cause the processing device 1012 to process player data 1044-1, game data 1044-2, tournament data 1044-3, and/or prize data 1044-4. Player data 1044-1, game data 1044-2, tournament data 1044-3, and/or prize data 1044-4 received via the input device 1014 and/or the communication device 1018 may, for example, be analyzed, sorted, filtered, decoded, decompressed, ranked, scored, plotted, and/or otherwise processed by the processing device 1012 in accordance with the game instructions 1042-1.

In some embodiments, player data 1044-1, game data 1044-2, tournament data 1044-3, and/or prize data 1044-4 may be fed by the processing device 1012 through one or more mathematical and/or statistical formulas and/or models in accordance with the game instructions 1042-1 to provide online game session, identify and/or manage player relationships, and/or provide "play-together" incentives such as group RAF rewards, in accordance with embodiments described herein.

In some embodiments, the interface instructions 1042-2 may be operable to cause the processing device 1012 to process player data 1044-1, game data 1044-2, tournament data 1044-3, and/or prize data 1044-4. Player data 1044-1, game data 1044-2, tournament data 1044-3, and/or prize data 1044-4 received via the input device 1014 and/or the communication device 1018 may, for example, be analyzed, sorted, filtered, decoded, decompressed, ranked, scored, plotted, and/or otherwise processed by the processing device 1012 in accordance with the interface instructions 1042-2. In some embodiments, player data 1044-1, game data 1044-2, tournament data 1044-3, and/or prize data 1044-4 may be fed by the processing device 1012 through one or more mathematical and/or statistical formulas and/or models in accordance with the interface instructions 1042-2 to provide one or more game interfaces (e.g., the interfaces 920*a-e* of FIG. 9A, FIG. 9B, FIG. 9C, FIG. 9D, and FIG. 9E) such as to provide group RAF rewards, in accordance with embodiments described herein.

Any or all of the exemplary instructions and data types described herein and other practicable types of data may be stored in any number, type, and/or configuration of memory devices that is or becomes known. The memory device 1040 may, for example, comprise one or more data tables or files, databases, table spaces, registers, and/or other storage structures. In some embodiments, multiple databases and/or storage structures (and/or multiple memory devices 1040) may be utilized to store information associated with the apparatus 1000. According to some embodiments, the memory device 1040 may be incorporated into and/or otherwise coupled to the apparatus 1000 (e.g., as shown) or may simply be accessible to the apparatus 1000 (e.g., externally located and/or situated).

In some embodiments, the apparatus 1000 may comprise a cooling device 1050. According to some embodiments, the cooling device 1050 may be coupled (physically, thermally, and/or electrically) to the processing device 1012 and/or to the memory device 1040. The cooling device 1050 may, for example, comprise a fan, heat sink, heat pipe, radiator, cold plate, and/or other cooling component or device or combinations thereof, configured to remove heat from portions or components of the apparatus 1000.

Referring now to FIG. 11A, FIG. 11B, FIG. 11C, and FIG. 11D, perspective diagrams of exemplary data storage devices 1140*a-d* according to some embodiments are shown. The data storage devices 1140*a-d* may, for example, be utilized to store instructions and/or data such as the game instructions 1042-1 and/or interface instructions 1042-2, each of which is described in reference to FIG. 10 herein. In some embodiments, instructions stored on the data storage devices 1140*a-d* may, when executed by a processor (such as the processor device 1012 of FIG. 11), cause the implementation of and/or facilitate the method 800 described in conjunction with FIG. 8, and/or portions thereof, as described herein.

According to some embodiments, the first data storage device 1140*a* may comprise a CD, CD-ROM, DVD, Blu-Ray™ Disc, and/or other type of optically-encoded disk and/or other computer-readable storage medium that is or becomes know or practicable. In some embodiments, the second data storage device 1140*b* may comprise a USB keyfob, dongle, and/or other type of flash memory data storage device that is or becomes know or practicable. According to some embodiments, the third data storage device 1140*c* may comprise RAM of any type, quantity, and/or configuration that is or becomes practicable and/or desirable. In some embodiments, the third data storage device 1140*c* may comprise an off-chip cache such as a Level 2 (L2) or Level 3 (L3) cache memory device. According to some embodiments, the fourth data storage device 740*d* may comprise an on-chip memory device such as a Level 1 (L1) cache memory device.

The data storage devices 1140*a-d* may generally store program instructions, code, and/or modules that, when executed by an electronic and/or computerized processing device cause a particular machine to function in accordance with embodiments described herein. In some embodiments, the data storage devices 1140*a-d* depicted in FIG. 11A, FIG. 11B, FIG. 117C, and FIG. 11D are representative of a class and/or subset of computer-readable media that are defined herein as "computer-readable memory" (e.g., memory devices as opposed to transmission devices). While computer-readable media may include transitory media types, as utilized herein, the term computer-readable memory is limited to non-transitory computer-readable media.

In some embodiments, additional functionality related to group referrals may be provided. Various reports detailing referral relationships between players, expiration dates associated therewith, total increased bonus and/or win amounts attributable to such relationships, etc. may be provided to players and/or system operators. In some embodiments, game plays with related players and/or game plays without related players may be tracked, monitored, and/or reported on. A player may be notified, for example, of how much in group RAF bonuses has been forfeited due to not playing games and/or not playing games with related players. In some embodiments, games in which related players do play together may be analyzed to predict and/or determine appropriate and/or desired times (e.g., future games, game types, rooms, etc.) in and/or via which to provide targeted promotions to such players (e.g., to a group of RAF players and/or friends).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method of conducting an online multiplayer game, wherein completion of a session of the online multiplayer game results in an awarding of a prize to a winner of the online multiplayer game, comprising:

- determining, by a processing device, a first player of the online multiplayer game;
- determining, by the processing device, a second player of the online multiplayer game;
- determining, by the processing device, that the second player has registered as a player of the online multiplayer game as a result of a referral by the first player;
- determining, by the processing device, that the first and second players have joined the same session of the online multiplayer game;

determining, by the processing device, that at least one of the first and second player is the winner of the session of the online multiplayer game; and applying, by the processing device and based on the determination that the first and second players are playing in the same session of the online multiplayer game and that the second player has registered as a player of the online multiplayer game as a result of a referral by the first player, a multiplier to the prize.

2. The method of claim 1, further comprising:

altering, based on the determining that the first and second players have joined the same session of the online multiplayer game, the prize.

3. The method of claim 2, wherein the altering occurs prior to a start of the session of the online multiplayer game.

4. The method of claim 1, wherein the determining that the first and second players have joined the same session of the online multiplayer game, comprises:

determining that the first and second players are playing in the same session of the online multiplayer game.

5. The method of claim 1, further comprising:

altering, based on the determining that the first and second players have joined the same session of the online multiplayer game, a prize of a subsequent session of the online multiplayer game.

6. The method of claim 5, wherein the session of the online multiplayer game is conducted via a particular online gaming room and wherein the subsequent session of the online multiplayer game for which the prize is altered is also conducted via the particular online gaming room.

7. The method of claim 1, wherein the determining that the second player has registered as a player of the online multiplayer game as a result of the referral by the first player, comprises:

receiving, from the second player, a code indicative of the first player.

8. The method of claim 1, wherein the determining that the second player has registered as a player of the online multiplayer game as a result of the referral by the first player, comprises:

receiving, from the second player, an identifier of the second player; and determining that the identifier of the second player is stored in a database record associated with the first player.

9. The method of claim 1, wherein the session of the online multiplayer game comprises a session of an online multiplayer bingo game.

10. A method, comprising:

identifying, by an electronic device, a referral relationship between a first registered player and a second registered player;

determining, by the electronic device, that the first and second players have joined the same online game room of a multiplayer online game, in which game all joined players compete for a win amount based on a pay table; and altering, by the electronic device and based on the determining that the first and second players have joined the same online game room of the multiplayer online game, the win amount of a future session of the multiplayer online game conducted in the online game room.

11. A method of rewarding group referrals in an online multiplayer game, comprising:

determining, by a server device, that a player is a winner of a session of an online multiplayer game;

determining, by the server device, a number of other players of the session of the online multiplayer game that are referral players related to the winning player; and determining, by the server device and based on (i) a base win amount and (ii) the number of referral players, a win amount to be provided to the winning player.

12. The method of claim 11, further comprising:

providing the win amount to the winning player.

13. The method of claim 11, wherein the determining of the win amount comprises:

multiplying the number of referral players and at least one bonus multiplier to define a bonus amount; and adding the bonus amount to the base win amount.

14. The method of claim 11, wherein the determining of the win amount comprises:

determining a bonus multiplier associated with the number of referral players; and multiplying the bonus multiplier and the base win amount.

15. The method of claim 11, wherein the determining of the win amount comprises:

determining a bonus multiplier associated with the number of referral players;

multiplying the bonus multiplier and the base win amount to define a bonus amount; and adding the bonus amount and the base win amount.

16. The method of claim 11, wherein the referral players related to the winning player comprise downstream referral players.

17. The method of claim 11, further comprising:

adjusting, by the server device and prior to the determining that the player is the winner of the session of the online multiplayer game and based on the determining of the number of other players of the session of the online multiplayer game that are referral players related to the player, the base win amount.

18. The method of claim 11, wherein the number of referral players is greater than zero.

19. The method of claim 11, wherein the number of referral players is greater than one.

20. The method of claim 11, further comprising:

determining, by the server device, that a second player is also a winner of the session of the online multiplayer game;

determining, by the server device, that no other players of the session of the online multiplayer game are referral players related to the second player; and providing the base win amount to the second player.

* * * * *